US009924290B2

(12) United States Patent
Babayoff et al.

(10) Patent No.: US 9,924,290 B2

(45) Date of Patent: Mar. 20, 2018

(54) METHOD AND SYSTEM FOR GENERATION OF SOUND FIELDS

(71) Applicant: NOVETO SYSTEMS LTD., Rishon Lezion (IL)

(72) Inventors: Noam Babayoff, Rishon Lezion (IL); Tomer Shani, Rishon Lezion (IL)

(73) Assignee: NOVETO SYSTEMS LTD., Rishon Lezion (IL)

( * ) Notice: Subject to any disclaimer, the term of this patent is extended or adjusted under 35 U.S.C. 154(b) by 111 days.

(21) Appl. No.: 14/443,019

(22) PCT Filed: Nov. 18, 2013

(86) PCT No.: PCT/IL2013/050952

§ 371 (c)(1),
(2) Date: May 14, 2015

(87) PCT Pub. No.: WO2014/076707

PCT Pub. Date: May 22, 2014

(65) Prior Publication Data

US 2015/0304789 A1 Oct. 22, 2015

(30) Foreign Application Priority Data

Nov. 18, 2012 (IL) .......................................... 223086

(51) Int. Cl.
*H04B 3/00* (2006.01)
*H04S 7/00* (2006.01)
(Continued)

(52) U.S. Cl.
CPC .............. *H04S 7/302* (2013.01); *G10K 15/02* (2013.01); *H04R 1/403* (2013.01); *G10K 11/343* (2013.01); *H04R 2217/03* (2013.01)

(58) Field of Classification Search
CPC ...... H04R 2217/03; H04R 1/403; H04R 1/32; H04R 1/323; G10K 11/26; G10K 11/34;
(Continued)

(56) References Cited

U.S. PATENT DOCUMENTS 5,532,438 A 7/1996 Brown
6,556,687 B1 4/2003 Manabe
(Continued)

FOREIGN PATENT DOCUMENTS

CN 1664610 9/2005
CN 101165775 4/2008
(Continued)

OTHER PUBLICATIONS

Berktay, H.O., "Possible Exploitation of Non-Linear Acoustics in Underwater Transmitting Applications", F. Sound Vib., 1965, pp. 435-461.
(Continued)

*Primary Examiner* — Duc Nguyen
*Assistant Examiner* — Kile Blair
(74) *Attorney, Agent, or Firm* — Dorsey & Whitney LLP

(57) ABSTRACT

A system and method for providing sound-data indicative of an audible sound to be produced and location-data indicative of a designated spatial location at which the audible sound is to be produced; and utilizing the sound-data and determining frequency content of ultrasound beams to be transmitted by an acoustic transducer system including an arrangement of ultrasound transducer elements for generating said audible sound. The ultrasound beams include primary audio modulated ultrasound beam(s), whose frequency contents includes ultrasonic frequency components selected to produce the audible sound after undergoing non-linear interaction in a non-linear medium, and additional ultrasound beam(s) each including ultrasonic frequency component(s). The location-data is utilized for determining focal points for the ultrasound beams respectively such that focusing the ultrasound beams on the focal points enables generation of a localized sound field with the audible sound in the vicinity of the designated spatial location.

23 Claims, 12 Drawing Sheets

(51) Int. Cl.
*G10K 15/02* (2006.01)
*H04R 1/40* (2006.01)
*G10K 11/34* (2006.01)

(58) Field of Classification Search
CPC .. G10K 11/341; G10K 11/343; G10K 11/346; G10K 11/348; G10K 11/175
See application file for complete search history.

(56) References Cited

U.S. PATENT DOCUMENTS

| | | | | |
|---|---|---|---|---|
| 7,146,011 | B2 | 12/2006 | Yang et al. | |
| 2004/0151325 | A1 | 8/2004 | Hooley et al. | |
| 2005/0195988 | A1 | 9/2005 | Tashev et al. | |
| 2008/0159571 | A1 | 7/2008 | Hooley | |
| 2009/0296954 | A1 | 12/2009 | Hooley et al. | |
| 2011/0096941 | A1* | 4/2011 | Marzetta | G06F 3/013 381/92 |
| 2012/0039480 | A1* | 2/2012 | Willems | H04R 3/12 381/71.1 |

FOREIGN PATENT DOCUMENTS

| | | |
|---|---|---|
| CN | 101569882 | 11/2009 |
| CN | 101674512 | 3/2010 |
| CN | 102640517 | 8/2012 |
| EP | 0973152 | 1/2000 |
| EP | 1855506 | 11/2007 |
| WO | WO2006/005938 | 1/2006 |

OTHER PUBLICATIONS

Croft, et al. "Theory, History, and the Advancement of Parametric Loudspeakers A Technology Overview", Amercian Technology Corporation, 2001-2003, pp. 1-28.

Kalgaonkar, et al., "Ultrasonic Doppler Sensor for Voice Activity Detection", Mitsubishi Electric Research Laboratories, Inc., Aug. 2008, 5 pages.

Tanaka, et al., "Active noise control using a steerable parametric array loudspeaker", Acoustical Society of America, Jun. 2010, pp. 3526-3537.

Westervelt, Peter J., "Parametric Acoustic Array", The Journal of Acoustical Society of America, vol. 35, No. 4, Apr. 1963, pp. 535-537.

Zhu, et al., "Multimodal Speech Recognition with Ultrasonic Sensors", Interspeech, 2007, pp. 662-665.

International Search Report for International Application No. PCT/IL2013/050952, dated Jul. 1, 2014.

* cited by examiner

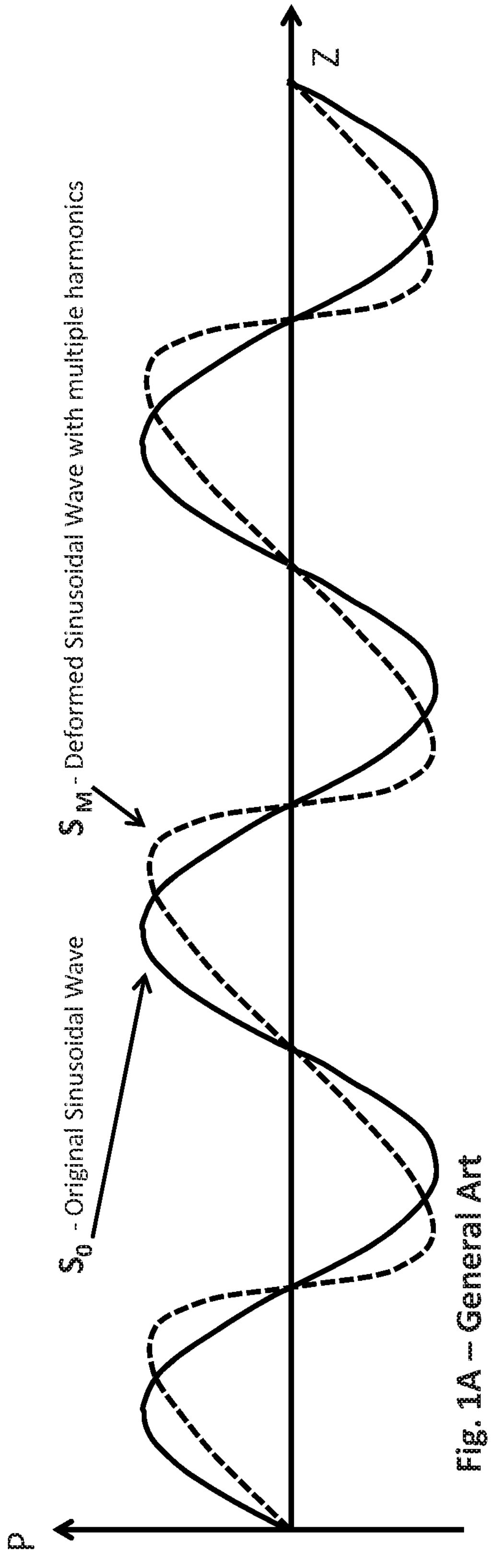
Fig. 1A – General Art
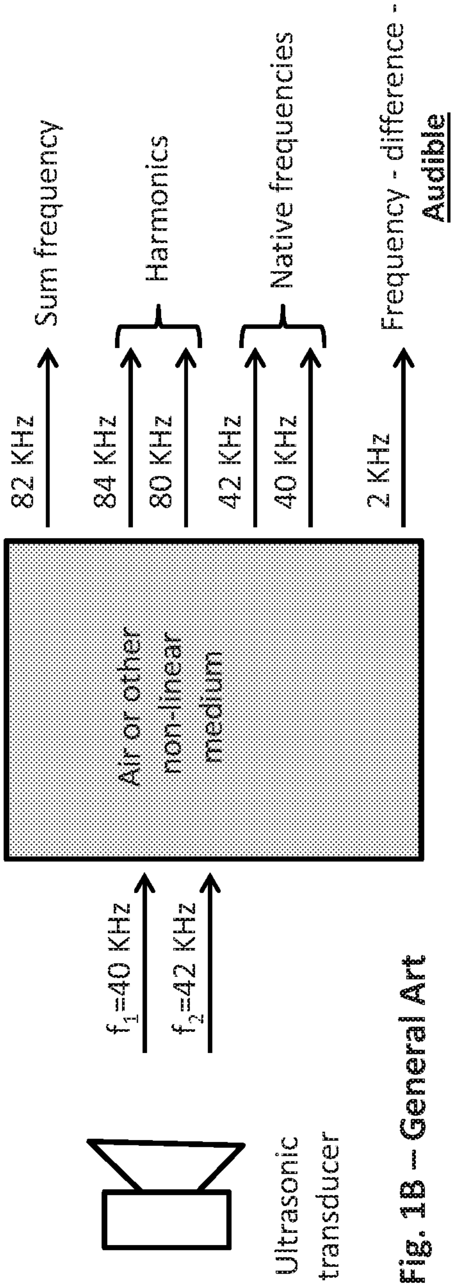
Fig. 1B – General Art

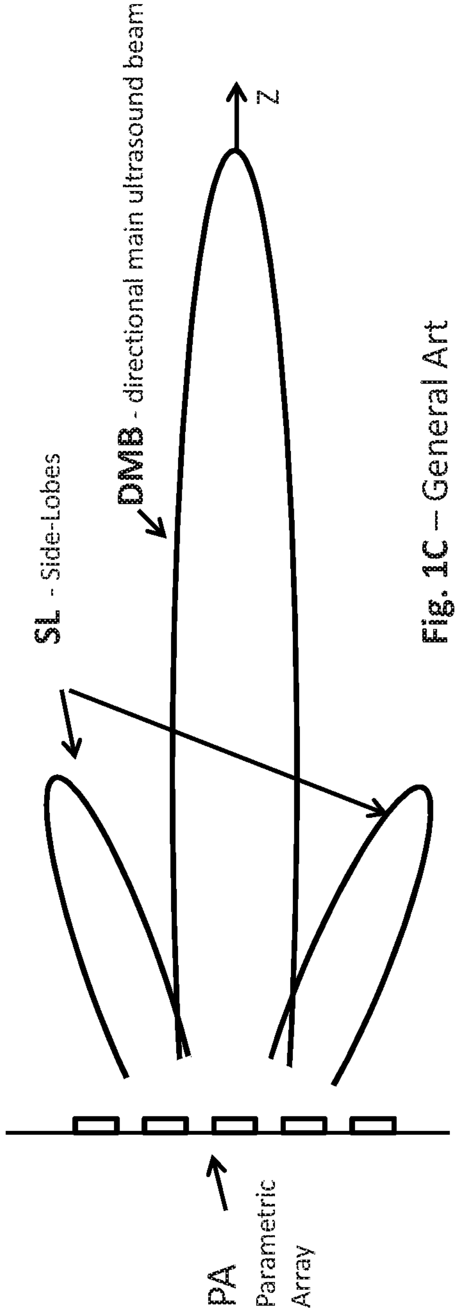
Fig. 1C – General Art
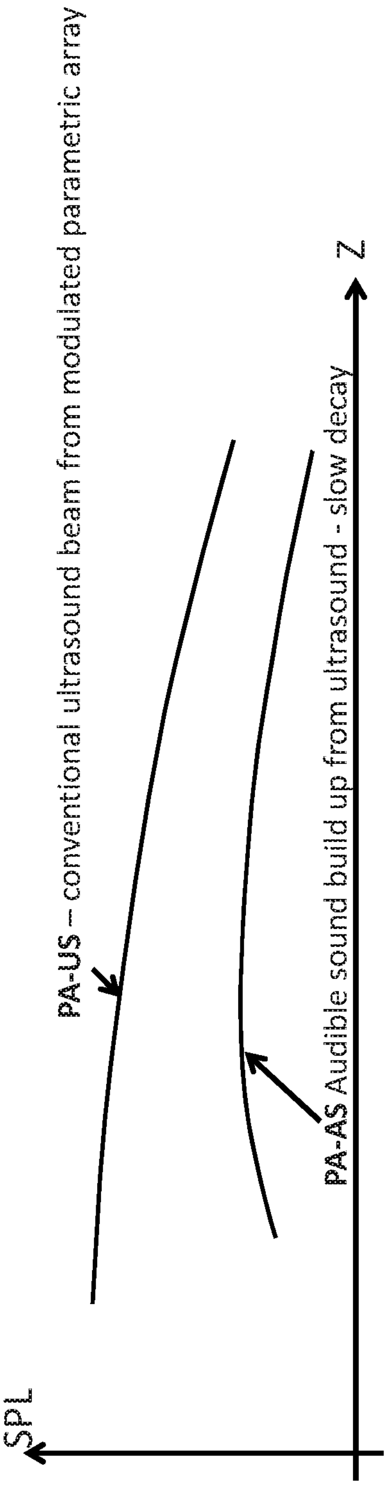
Fig. 1D – General Art

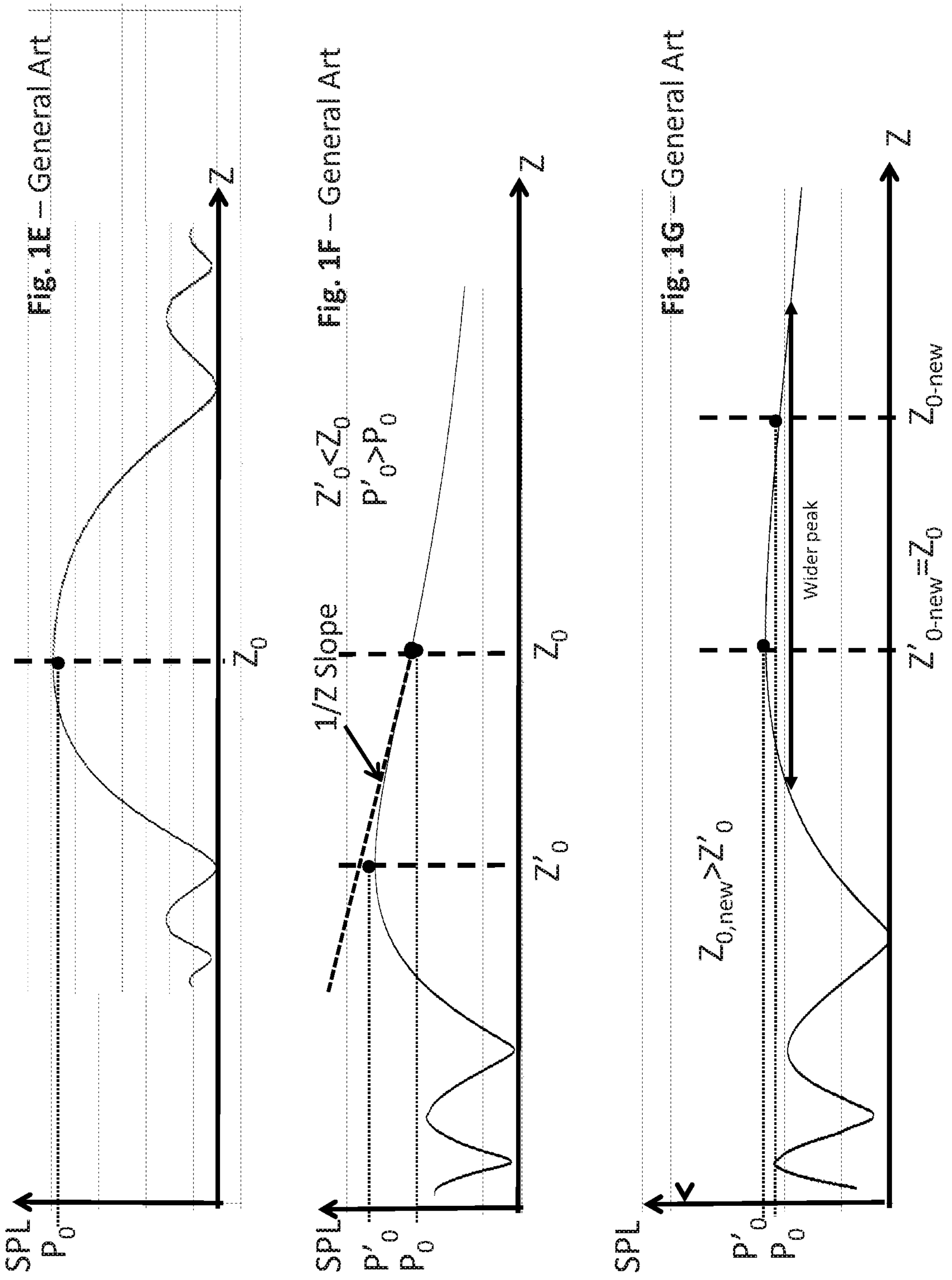
Fig. 1E – General Art
Fig. 1F – General Art
Fig. 1G – General Art

300

METHOD AND SYSTEM FOR GENERATION OF SOUND FIELDS

TECHNOLOGICAL FIELD

This invention relates to techniques for generating sound fields. Particularly, the invention provides methods and systems for generating localized sound fields by utilizing audible sound from ultrasound techniques.

BACKGROUND

There are various technologies explored for targeting sound and particularly audible sound to be heard at particular region(s) in space (i.e. bright zones) while being suppressed at other regions (i.e. dark zones) such that in those regions the sound pressure level is below the hearing threshold or is sufficiently low such that it is perceived as part of the surrounding noise.

Existing solutions for generation of targeted sound can roughly be classified into two main technological categories:

- Technologies utilizing the conventional acoustical wave theory for manipulating audible sound waves (i.e. sound waves of relatively long wavelengths).
- Technologies utilizing the so called non-linear air-borne ultrasound modulation for generation of audible sound. These techniques manipulate the frequency content of non-audible ultrasonic (US) waves (i.e. sound waves of relatively short wavelengths) and rely on the non-linearity of the sound propagation medium (e.g. air/water) for the generation of audible sound from the short ultrasonic waves.

Technologies utilizing the conventional acoustical wave theory for manipulating long audible waves are disclosed for example in U.S. Pat. No. 5,532,438. Products utilizing such technologies include for example the Secret Sound® directional speaker system product of Museum Tools and the focused arrays product of Dakota Audio (e.g. the floor mounted focused arrays product FA-603).

The phenomena of air (and water) non-linear medium behavior under high SPL sound wave transmission was discovered 45 years ago when experimenting on sonar waves for submarines (see "Parametric Acoustic Array" by Peter J. Westervelt, published in *The Journal of the Acoustical Society of America"* volume 35, number 4, April 1963, pages 535-537). This effect is described mathematically by the Khokhlov-Zabolotskaya-Kuznetsov (KZK) equation which describes the propagation of waves in space in consideration of waves interference, waves dispersion and non-linear response of the medium (e.g. air) through which the waves propagate. An approximation typically used for solving the Khokhlov-Zabolotskaya-Kuznetsov (KZK) equation on the depth axis (axial direction) is provided for example in "Possible exploitation of non-linear acoustics in underwater transmitting applications" by H. O. Berktay, published in *J. Sound Vib.* (1965) 2 (4), 435-461.

Technologies utilizing the non-linear air-borne ultrasound modulated technique can generally be categorized to two main approaches, each providing a somewhat different result, and each suited for different purposes. According to one of these approaches, a directional audio beam demodulates from high frequency ultrasound waves at high sound pressure level (SPL). This approach generally provides the transmission of a highly directional and relatively narrow audio beam propagating along a predetermined direction with low decay rate in the SPL along this direction. Systems operating in accordance with this approach include for example Audio Spotlight™ by Holosonic Research labs, inc., HSS—hyper sonic sound system by Audionation-Uk Ltd (e.g. HSS model 3000) and also products of LRAD Corporation.

An alternative approach for utilizing the non-linear air-borne ultrasound modulated effect is based on focusing ultrasonic wave beams to a predetermined region. Technologies based on this approach are disclosed for example in U.S. Pat. No. 6,556,687 and in U.S. Pat. No. 7,146,011. This technology, however, did not mature to commercial device implementation due to difficulties in providing appropriate focusing capabilities.

GENERAL DESCRIPTION

There is a need in the art for a novel technique for targeting sound and particularly audible sound to be heard at a defined spatial location/region and not heard at other regions. There is a particular need for a technique that enables production of a localized audible sound field in the vicinity of certain region(s)/point(s) in space while limiting the production of audible sound to these region(s) and suppressing/preventing the generation of audible sounds at regions outside this certain region. There is also a need in the art for a technique allowing generation of localized audible sound fields by utilizing relatively small acoustic transducer systems (e.g. with effective sound generation apertures in the scale of several centimeters to several decimeters) for generating the localized audible sound field within a predefined region located in proximity to the acoustic transducer system, for example within a range of a few meters therefrom or even within a range of several/a few decimeters (e.g. a region located near about the Rayleigh distance from the sound generation aperture or closer thereto).

In this connection, it is noted that the term sound is used herein in its broadest meaning to denote any acoustic signal/beam which may be in the audible frequency regime and/or in other regimes such as ultrasound regime. Accordingly, the term acoustic/sound transducer system is used herein to denote an arrangement of one or more acoustic/sound transducers (speakers) operable in the audible and/or ultrasonic frequency bands. The effective sound generation aperture of such systems is considered herein as the lateral extent of the arrangement/array of sound transducer elements/membranes or as the dimensions of the membrane in case only a single element is used in the sound transducer system. In this connection, the Rayleigh distance is an approximated boundary between a near field region (in which Fresnel diffraction dominates) and a far field region (in which Fraunhofer diffraction dominates) and is typically approximated as $Z_R=\pi D^2/4\lambda$ where D is the diameter/characteristic-size of the effective sound generation aperture, $\lambda$ is the sound wavelength and $Z_R$ is the Rayleigh distance with respect to the transducer. It should be noted that the term Rayleigh distance is considered herein in its broad meaning referring to distances up to which the effects of near-field/Fresnel diffraction are audible. Accordingly, in some cases the Rayleigh distance may extend more than the approximation of $Z_R$ above.

Conventional approaches for targeting audible sound are based on the acoustical wave theory for manipulating long audible waves generally directed and/or focused on the sound field by utilizing sound/acoustic-fields emitters/transducers having an effective sound generation aperture in the order of magnitude of audible wavelengths. For example, for targeting a 1 KHz audible tone (i.e. wavelength of about 30 cm), a sound transducer system with an effective aperture of about 30 cm is needed. Thus, minimizing such systems to sizes suitable for portable devices is theoretically and practically limited. Moreover, in accordance with the wave theory, the smallest focal point diameter (the diffraction limited spot) cannot be reduced below the wavelength of the wave even with ideal systems, and is typically substantially larger in practice. This substantially limits the size of a localized sound field produced by such systems, as well as the spatial resolution at which the properties of the sound field can be controlled.

Other known in the art techniques utilize the so-called Audible Sound from Ultrasound techniques for producing an audible sound. The Audible Sound from Ultrasound production is generally based on the phenomena of non-linear demodulation of ultrasound beams by a non-linear medium such as air (also referred to herein as non-linear air-borne modulated ultrasound beams). The principles of Audible Sound from Ultrasound production and of non-linear demodulation of ultrasound beams by a non-linear medium are readily known in the art. These principles will be however briefly described here, to facilitate understanding of the present invention. By utilizing multiple acoustic transducers with membrane size in the order of ultrasonic wavelength, a narrow ultrasound beam, which is almost collimated (see for example FIG. 1C), may be produced with high sound pressure level (SPL) in the beam. Generation of high SPL in the ultrasonic regime causes non-linear behavior of the air molecules (possibly also in other non-linear mediums, such as water). Such non-linear behavior is typically manifested by a positive correlation between the amplitude of the sound and the speed of the medium's molecules. For example, such non-linear behavior may result in the formation of a so called saw-tooth wave profile from a high SPL sinusoidal ultrasonic wave which is transduced/injected to the propagating medium (e.g. air) by an acoustic transducer system. In fact, the non-linear behavior of the medium applies modulation/de-modulation to the input sound/acoustic wave and introduces additional predictable frequencies (e.g. harmonics and other frequencies) to the input wave (see for example FIG. 1A). Proper selection of the ultrasonic waves injected/transduced in the non-linear medium may cause the production of such additional frequencies in the audible sound region (i.e. conventionally defined as sound with frequencies ranging between 20 Hz to 20 KHz). FIG. 1B is a schematic illustration of the production of audible sound from a modulated ultrasonic beam/waveform. Utilizing ultrasonic waves having short wavelengths (i.e. in the millimetric or sub-millimetric wavelengths typically below 17 mm) may provide for generation of audible sound beams/fields with improved resolution and directional accuracy than that achievable by conventional production of audible sounds from audio waves.

Devices, known as Parametric Arrays, are conventionally used for generation of audible sounds from ultrasound based on the non-linear air-borne modulated ultrasound effect. Typically, in such devices, the plurality of ultrasonic transducers/emitters are fed in parallel with the similar ultrasonic signal (i.e. with the same amplitude and phase), thereby producing a very directional ultrasonic beam which in turn yields a directional audible sound beam. For example, some systems are capable of directing audio beams to distances of over 1000 m, yet having >80 dB SPL.

However, although the conventional Parametric Arrays produce directional sound/acoustic beams, these sound beams are not focused and actually provide a relatively distortion-free sound field only in the far-field region (i.e. significantly beyond the Rayleigh distance from the sound-transducer/parametric-array) at which the sound waves are not influenced by the strong near-field interactions (e.g. Fresnel diffraction) that cause considerable amplitude fluctuation. Additionally, it is problematic to migrate the conventional technique to small-scale/portable electronic communication devices and also it is problematic to utilize such techniques for producing localized sound field near a targeted user. This is at least because parametric array devices/technologies produce non-focused and substantially collimated directional sound beams which propagate similarly to laser light beams with slow decay of the beam's SPL, which is thus maintained high also at regions substantially beyond the targeted location (e.g. user location). This slow decay may result in the following unwanted effects: (1) loss of privacy for the user and/or unwanted disturbance of the surroundings (e.g. as anyone behind the user might hear the sound field—the conversation/music); (2) echoes generated by reflection of the sound beam from various objects (e.g. this may occur even if objects, such as walls, are distant from the acoustic transducer due to the collimation/high-directionality of the sound beam). Also the use of such techniques to produce sound in the vicinity of a user/target may be energetically inefficient due to the lack of focusing of the sound. Accordingly, such techniques may be incompatible for use with battery operated portable/mobile devices.

Indeed, as mentioned above, there are some known in the art techniques which are aimed at focusing sound to a specific point (i.e. U.S. Pat. Nos. 6,556,687 and 7,146,011). However, these techniques for focusing sound result in a sound field having a residual audible sound tail having long decay after the designated target/focusing-point and/or with residual sound bouncing from objects located after the target. Thus, people located at various other locations in the space (e.g. after the targeted focal point/region) may hear the residual sounds. Additionally, these techniques are associated with poor focusing capabilities, resulting in lack of ultrasound energy focused at the focal point, and, accordingly, weak audible sound at the target location.

The present invention is inter-alia aimed at solving the above mentioned problems of the conventional techniques, and specifically it enables production of a localized audible sound field having sufficient SPL at the targeted spot (e.g. of at least 60-70 dB) while eliminating or substantially reducing residual sounds accompanying the generation of such localized audible sound fields (e.g. to be at least 10 to 20 dB lower than the audible sound at the localized audible sound field). In particular, the invention provides for eliminating or at least significantly suppressing a residual audible sound tail which typically follows the focal point at which audible sound is produced by conventional techniques.

In this connection, it should be understood that the term localized audible sound field is used here to describe an audible sound field having substantial/audible SPL at a certain "bright zone" surrounding the focal point to which the sound is focused. It should be also understood that the term localized audible sound field is used in the context of the present invention to describe an audible sound field having negligible/non-audible SPL at a certain "dark zone" outside the bright zone. In this connection, it is noted that the localized audible sound field produced in accordance with the technique of the present invention may acquire the shape of a bubble and may extend from a region close to the acoustic transducer system to a region surrounding the target focal point, and possibly slightly beyond the focal point (e.g. by several decimeters and preferably not more than about 40 to 50 centimeters). The sound bubble (i.e. the bubble shaped localized audible sound field) may be elongated along the axial direction of sound/acoustic-field propagation between the acoustic transducer and the target focal point while being relatively narrow in the traverse directions (i.e. perpendicular to that axial direction). The bright zone, at which audible sound has sufficient SPL and is clearly audible, generally occupies at least a region of the sound bubble which surrounds the target focal point by a certain diameter (e.g. 40 cm). The dark zone may be considered as the regions in space which are located outside the sound bubble. In the dark zone region, audible sound SPL is sufficiently low such that the sound cannot be heard/comprehended and/or the SPL of the generated audible sound is of the order of the SPL of ambient noise or below.

The technique of the invention utilizes the basic principles of sound from ultrasound techniques and specifically the non-linear demodulation of ultrasound beams by a non linear medium through which they propagate. In order to provide accurate localized sound fields focused on a certain target (i.e. at a certain spatial location/region), the properties of at least two ultrasonic beams are determined. At least one of the beams is an audio modulated ultrasound beam (also referred to herein as primary audio modulated ultrasound beam or primary beam) whose frequency content is indicative of the audio content that should be produced at the target/spatial-location at which the localized sound field should be produced. This primary audio modulated ultrasound beam is typically focused at the desired target/spatial-location and/or proximate thereto and is the source of an audible sound field which is generated at the target location by the non-linear de-modulation of the ultrasonic frequency components of this primary beam while it propagates through a non-linear medium. As is conventional, the primary audio modulated ultrasound beam includes two or more ultrasonic frequency components, typically including at least one carrier frequency component and one or more additional modulation frequency components modulating the carrier frequency. In addition to the primary beam, at least two ultrasonic beams include one or more additional/corrective ultrasonic beams whose properties are selected such as to interfere (e.g. destructively) with at least one of the ultrasonic frequency components of the primary beam and/or with the audible sound produced by the primary beam, thus improving the localization and focusing accuracy of the audio sound field produced by the audio modulated ultrasound beam. In other words, the properties (e.g. frequency content, phase(s) and/or amplitude(s)) of these additional/corrective beams are selected to affect the spatial SPL profile of the audible sound generated by the primary audio modulated ultrasound beam to improve its localization/focusing at the desired spatial-location. These one or more additional beams are therefore also referred to herein generally as corrective beams.

The additional/corrective beams are typically focused on somewhat different focal points than the focal point of the primary audio modulated ultrasound beam and they typically have different phase (e.g. opposite phase) and/or different amplitude with respect to the primary audio modulated ultrasound beam. To this end, focusing of the corrective beams on a focal point different than that of the primary audio modulated beam results in their SPL profiles having different shapes than the SPL profiles of the primary audio modulated beam. The technique of the present invention utilizes proper selection of the focal points of the primary audio modulated beam and the corrective beams, such that the SPL profiles of sonic and/or ultrasonic components of the corrective beams may destructively interfere with the SPL profiles of one or more ultrasonic components of the primary audio modulated ultrasound beam and/or of the audible sound generated by the primary beam to thereby suppress undesired residual audible sound which may be generated by the primary audio modulated beam at certain one or more regions. Accordingly, the phase differences between respective components of the corrective beams and respective components of the primary beam are selected to produce destructive interference at these regions.

It should be understood that the term beam and/or sound beam is used herein to designate a propagating acoustic waveform (collimated or not) which is associated with a certain general direction of propagation and with a certain focal point on which it is focused. The focal point(s) of the beams are typically positive (e.g. real focus), however the term focal point should generally be understood in its broad meaning to include also a negative focal point (e.g. imaginary focus) and/or infinitely distant focus/focal point (e.g. a substantially collimated beam). Indeed, each beam may be a multiplex of one or more frequencies with one or more different phases. The beams, referred to in the present disclosure, are generally differentiated from one another by their respective focal points and possibly also by their amplitudes and phases.

Thus, according to the present invention a localized audible sound field is produced by a primary audio modulated beam focused on a certain location and one or more additional/corrective beams focused on one or more different locations and interfering with the primary beam. According to the invention the one or more beams may include corrective beams operating in accordance with somewhat different principles for canceling/suppressing the residual sound (e.g. high SPL tail) that is generated by the primary audio modulated ultrasound beam. For example, the one or more additional/corrective beams may include a corrective ultrasonic beam (referred to in the following as primary corrective ultrasonic beam/frequency-components) whose properties are selected to destructively interfere with the certain ultrasonic frequency component(s) of the primary audio modulated ultrasound beam at certain regions in which the undesired residual audible sound from the primary audio modulated beam should be suppressed. Alternatively or additionally, the one or more additional/corrective beams may include an additional/secondary audio modulated ultrasound beam whose properties are selected such as to produce (by non-linear demodulation) an audible sound field whose SPL profile and phase destructively interfere with at least certain portions of the undesired residual audible sound generated by the primary audio modulated beam. To this end, the secondary audio modulated ultrasound beam operates in the audible frequency regime to affect suppression residual sound by audible noise cancellation. The additional/secondary audio modulated ultrasonic beam is also referred to herein interchangeably as audio modulated corrective beam/frequency-components. In cases where a secondary audio modulated corrective beam is used, another type of corrective beam, which is referred to herein as a secondary corrective ultrasonic beam, may also be used in order to adjust the shape of the spatial audible SPL profile of the secondary audio modulated ultrasonic beam and to thereby improve the spatial accuracy of the noise cancellation provided by the secondary audio modulated ultrasonic beam. It should be understood that the secondary corrective ultrasonic beam(s) is/are used for shaping the audible SPL profile of the secondary audio modulated ultrasonic beam using the same technique by which the primary corrective ultrasonic beam(s) are used for shaping the audible SPL profile of the primary audio modulated ultrasonic beam.

According to some embodiments of the present invention, a localized sound field with sufficiently suppressed residual audible sound is obtained by utilizing corrective beams including at least primary corrective ultrasonic beam(s) and secondary audio modulated ultrasonic beam(s).

Specifically, when utilizing a corrective ultrasonic beam (e.g. primary/secondary corrective ultrasonic beam) for suppressing residual sound generated by an audio modulated ultrasound beam (e.g. by the primary/secondary audio modulated ultrasound beam), the corrective ultrasonic beam typically includes at least one frequency component having similar frequency as a certain respective ultrasonic frequency component (e.g. a carrier/modulation frequency component) of the audio modulated ultrasound beam whose SPL profile is to be corrected thereby. The corrective ultrasonic beam may thus interfere with the respective ultrasonic frequency component of the audio modulated ultrasound beam to improve the shape of its SPL profile and thereby improve the shape of audible SPL profile produced by the audio modulated ultrasound beam. Focusing the corrective ultrasonic beam on various focal points affects the shape of its SPL profile. Therefore, utilizing appropriate adjustment of the focal point of the corrective ultrasonic beam, its SPL profile's shape is controlled, as will be further described below, to provide desired/optimized pattern of interference with one or more ultrasonic frequency components (e.g. carrier/modulation components) of the audio modulated beam (e.g. to produce destructive interference at certain regions outside a designated spatial location and/or constructive interference in the vicinity of the designated spatial location). The amplitude of the corrective ultrasonic beam as well as its phase relative to the phase of the certain ultrasonic frequency component of the audio modulated beam, are also adjusted to provide the desired interference pattern resulting in suppression of residual audible sound generated by the audio modulated ultrasound beam and/or with amplification of the sound at a desired location. This technique of the invention may be used to suppress the residual audible sound which is produced by the primary audio modulated ultrasound beam.

As noted above, a corrective ultrasonic beam may be used to modify the SPL profile of one or more ultrasonic frequency components of the audio modulated beam. These one or more ultrasonic frequency components may include carrier and/or modulation ultrasonic frequency components. In some cases, the corrective ultrasonic beam may include two or more frequency components focused to substantially the same focal point and be operable for interfering with respective two or more ultrasonic frequency components of the audio modulated beam. Alternatively or additionally, two or more corrective ultrasonic beams may be utilized for respectively interfering and shaping the SPL profiles of two or more respective two ultrasonic frequency components of the audio modulated beam. In this regard, an audio modulated ultrasound beam (e.g. being the primary/secondary audio modulated ultrasound beam), typically includes a plurality (e.g. two or more) of ultrasonic frequency components which are focused on a certain common focal point. A corrective ultrasonic beam, associated with such an audio modulated ultrasound beam, typically includes a single frequency component with frequency corresponding to a respective one frequency component of the audio modulated beam associated therewith. Thus, in many cases, a plurality of corrective ultrasound beams, which are associated with several different frequency components focused at different locations, are used to correct the SPL of the audio modulated beam by interfering with at least some of its frequency components. The focal point of each such corrective ultrasonic beam is selected to produce a desired interference with corresponding frequency components of its respective audio modulated beam.

Alternatively or additionally, according to some embodiments, a secondary audio modulated beam may be utilized for suppressing the residual audible sound/noise of the primary audio modulated beam. The audible sound generated by the secondary audio modulated beam may interfere with the audible sound obtained from the primary audio modulated beam, thus reshaping the audible SPL profile of the primary audio modulated beam. The frequency content of the secondary audio modulated ultrasonic beam is typically indicative of the audible frequency content that should be produced at that target/spatial-location. However the phase and/or the focal point and/or amplitude of the secondary audio modulated ultrasonic beam may be different than that of the primary audio modulated ultrasound beam to provide noise cancellation suppressing of at least some of the residual audible sounds produced by the primary audio modulated ultrasound beam.

In some cases, the same carrier frequency may be used for both the primary audio modulated ultrasound beam and the secondary audio modulated ultrasonic beam and both beams are modulated utilizing single-side-band (SSB) amplitude-modulation (AM) to encode the same audible sound content. However, one of these beams may be modulated utilizing the upper side band (USB) AM modulation technique, and the other beam being modulated by utilizing the lower side band (LSB) AM modulation technique.

As noted above, in connection with the secondary audio modulated ultrasonic beam, an additional one or more secondary corrective ultrasonic beams may also be utilized to adjust the shape of the spatial audible SPL profile of the secondary audio modulated ultrasonic beam. The secondary corrective ultrasonic beams operate on the SPL profile of the secondary audio modulated ultrasonic beam in a manner similar to the operation of the primary corrective ultrasonic beams on the SPL profile of the primary audio modulated ultrasonic beam. Specifically, the frequency of the secondary corrective ultrasonic beams may be similar to the frequency of a respective one of the carrier and/or modulation ultrasonic frequency components of the secondary audio modulated ultrasonic beam while the phase and/or the focal point and/or the amplitude of the secondary corrective ultrasonic beam may be different than that of the secondary audio modulated ultrasonic beam. Also, optionally, two or more such secondary corrective ultrasonic beams may be utilized, e.g. one for shaping the profile of the carrier ultrasonic frequency component, and another for shaping the profile of the modulation ultrasonic frequency component of the secondary audio modulated ultrasonic beam.

Therefore, according to the invention, one or more primary audio modulated ultrasound beams may be used to carry audible sound information towards one or more spatial locations to produce thereat an audible sound field with the desired audible sound information. Different sound information may also be carried to different spatial locations by several primary audio modulated ultrasound beams. Additionally, one or more additional beams (e.g. corrective beams) are generated to improve the focusing/localizations of the audible sound field at the one or more spatial locations. Although at each spatial location, one or more primary audio modulated ultrasound beams may be directed/focused, typically only one such primary beams is directed/ focused in order to prevent non-linear interaction between different primary beams which may result in audible sound distortions. Also, each primary beam may be associated with one or more additional beams which may include one or more of the above mentioned: primary corrective ultrasonic beam(s), secondary audio modulated ultrasonic beam(s) and secondary corrective ultrasonic beam(s).

Focusing the primary and/or corrective beams on their respective focal points may be achieved by utilizing any suitable beam forming technique, for example by utilizing an arrangement/array of acoustic transducers such as phased arrays or other arrangement. Beam forming is used in accordance with the particular properties of the arrangement of acoustic transducers (sound transducing elements) used. The beam forming is used for generating respective signals to be provided to the acoustic transducer elements for producing appropriate waveforms/beams in the medium corresponding to the primary and/or additional beams Indeed, the same arrangement/array of acoustic transducers may be used to produce one or more of the primary audio modulated beams and additional ultrasonic beams To this end, respective signals provided to each of the acoustic transducing elements of the array may be formed as frequency multiplexed signals including the frequency components of multiple beams (e.g. frequency components of the primary and/or additional beams) with appropriate phases selected to generate those beams respectively directed to the desired direction(s) and focused on their respective focal points with the appropriate relative phase shifts between them. This thereby provides the generation of the localized audible sound field at the designated/target position. In this regard, acoustic transducing elements may each be operated separately and independently by their respective signal (e.g. composite/multiplexed signal carrying information such as phase, amplitude and/or frequency, of one or more of the primary and corrective beams), to collectively form together the primary and/or additional beams. The arrangement of the transducer elements can be in various shapes such as matrix, circular, hexagonal and more.

The invention also provides an audio communication system which is capable of providing a user (i.e. or more than one user) with a private audio communication zone/area in which he is able to privately communicate vocally and wirelessly with an audio communication located remotely from him (e.g. several decimeters to several meters away). Such private communication is characterized in that a private bright sound zone is defined in the vicinity of the user in which he can hear an audible sound communicated to him from the audio communication system. In the area outside this bright zone, a dark zone is defined such that other persons cannot hear or comprehend the content of the audio communication. The audio communication system may also be capable of locating the user while he is moving in the vicinity of the system and dynamically produce the bright zone in his vicinity (e.g. surrounding his head/ears). Additionally, the audio communication system may utilize various techniques for isolating the user's voice and/or other audible sounds he wishes to communicate to the audio communication system, while eliminating or suppressing ambient sounds from the surroundings, thereby enabling wireless bilateral audio communication to be transmitted between the user and the audio communication system without resorting to additional peripheral devices located on the user (e.g. in the vicinity of the user's ears/mouth).

Thus according to a broad aspect of the invention there is provided a method for generating a localized audible sound field at a designated spatial location, the method includes: providing sound-data indicative of an audible sound to be produced; utilizing the sound-data and determining frequency content of at least two ultrasound beams to be transmitted by an acoustic transducer system including an arrangement of a plurality of ultrasound transducer elements for generating the desired audible sound. The at least two ultrasound beams include at least one primary audio modulated ultrasound beam, whose frequency contents includes at least two ultrasonic frequency components selected to produce the desired audible sound after undergoing non-linear interaction in a non linear medium. Also the at least two ultrasound beams include one or more additional ultrasound beams, each including one or more ultrasonic frequency components. The method also includes providing location-data indicative of a designated spatial location at which that audible sound is to be produced and utilizing the location data and determining at least two focal points for the at least two ultrasound beams respectively such that focusing the at least two ultrasound beams on the at least two focal points enables generation of a localized sound field with the desired audible sound in the vicinity of the designated spatial location. Typically, the method may also include determining relative phases of the primary audio modulated ultrasonic beam and the one or more additional ultrasound beams such that when the primary audio modulated ultrasonic beam and the one or more additional ultrasound beams are focused on their respective focal points with the respective relative phases between them, a localized audible sound field with the desired audible sound is produced at the designated spatial location.

According to another broad aspect of the present invention there is provided a sound system including a processing utility that is connectable to an arrangement of multiple acoustic transducers which are capable of producing sound in the ultrasonic frequency band. The processing utility is adapted for obtaining/receiving sound-data indicative of an audible sound and location-data indicative of a spatial location at which to produce a localized sound field. The processing utility is configured and operable to carry out the operations according the method of the present invention (i.e. the method as described above and more specifically below) for utilizing the sound-data and the location-data and generating operative signals to be respectively provided to the multiple acoustic transducers for generating the localized sound field with the desired sound content and at the designated spatial location. In some embodiments the sound system of the invention includes the arrangement of multiple acoustic transducers. The arrangement of multiple acoustic transducers may for example be a substantially flat two dimensional array of acoustic transducer elements with characteristic sizes in the order the wavelength of the ultrasonic frequency band at of the ultrasonic beams generated by the system. Also, in some cases the lateral extent of the arrangement of multiple acoustic transducers is smaller than a distance between the arrangement/array of multiple acoustic transducers and a designated spatial location with respect to the array at which a localized sound field might be produced by the sound system.

According to yet another broad aspect of the invention there is provided a sound system including a processing utility connectable to an acoustic transducer system that includes an arrangement of multiple acoustic transducers. The acoustic transducers are capable of producing sound in the ultrasonic frequency band. The processing utility is adapted for obtaining/receiving sound-data indicative of a desired audible sound and location-data indicative of a designated spatial location and determining sound signals to be provided to the arrangement of multiple acoustic transducers for producing a localized sound field with the desired audible sound at the designated spatial location. The processing utility includes: an audio from ultrasonic modulation module capable of utilizing said sound-data for determining frequency content of at least two ultrasound beams to be transmitted by the acoustic transducer system. The at least two ultrasound beams include at least one primary audio modulated ultrasound beam and one or more additional ultrasound beams The frequency content of the primary audio modulated ultrasound beam includes at least two ultrasonic frequency components that are selected to enable sound from ultrasonic production of the audible sound while undergoing non-linear interaction in a non linear medium. The frequency content of the one or more additional ultrasound beams includes two or more frequency components to be superimposed with the primary audio modulated ultrasound beam for producing the desired localized sound field at the designated spatial location. The system also includes a focusing module capable of utilizing the location data and determining at least two focal points for the at least two ultrasound beams respectively, such that focusing the at least two ultrasound beams on the at least two focal points enables generation of a localized sound field with the desired audible sound in the vicinity of the designated spatial location. Typically according to some embodiments of the present invention the focusing module may also be capable of determining relative phases of the primary audio modulated ultrasonic beam and the one or more additional ultrasound beams such that when the primary audio modulated ultrasonic beam and the one or more additional ultrasound beams are focused on their respective focal points with the respective relative phases between them, a localized audible sound field with the desired audible sound is produced at the designated spatial location. The sound system of the invention may be included and/or connectable to the audio communication system described above and may be used to facilitate generation of localized sound field in such audio communication systems.

The audio communication system may include a locating system for identifying the location of at least one user location with respect to the audio communication system. The locating system may utilize one or more camera modules and/or acoustical targeting devices (such as a small sonar device) to constantly lock on the designated user and track his relative position. The audio communication system may also include a sound/acoustic-fields generation system operating in accordance with the technique of the present invention (as described above and as will be described in more detail below) for creating a localized audible sound field in the vicinity of the tracked user and thereby provide him with private communication of audible data/sounds from a distance. The sound system may include a processing utility configured and operable to dynamically compute wave patterns/beams in accordance with the required audio signal and the varying relative coordinates of the user. The audio communication system may also include an acoustic transducer system including an arrangement of acoustic transducer elements (e.g. arranged in a two dimensional array/flat-array) and capable of producing directive and/or focused ultrasonic beams The audio communication system may be adapted to utilize the multi-cell array of acoustic transducers (i.e. the arrangement of acoustic transducer elements) to steer and focus pressure waves to various angles within a hemisphere associated with the array plane. In some cases, in which the transducer array has a sufficient number of elements (e.g. the host apparatus having enough real-estate and the transducer array is big enough), the system may be adapted to create more than one localized audible sound fields at different locations, thus allowing servicing of more than one user concurrently. The system might be used for creating a binaural sound transmission, 3D sound immersion, and/or other sound effects such as various types of effects used in advanced gaming applications. For example, the system may be configured to utilize a surround input audio signal and/or an input signal indicative of a 3D sound field, and generate a corresponding 3D sound immersion field by directing sound beams to produce several localized audible sound fields at various locations in space which are determined in accordance with the input signal. This would thereby create a 3D illusion of sound emerging from different directions/positions with respect to the listening user.

To this end the present invention may be used for various applications including for example the following: communication devices such as mobile phones, personal computer devices (e.g. tablets, laptops, and desktop computers), entertainment devices (e.g. TV sets, entertainment and/or communication systems for various vehicle types), gym equipment, public automated machines (such as ATMs, vending machines, and unmanned information stands), and game consoles. The operation of all such devices may be enhanced by the capabilities of the system of the present invention to steer and focus the audio content to exclusive locations in space (e.g. directly to the ears of a designated listener) without other people in their vicinity hearing the audio content. Moreover, for personal communication devices such as mobile phones, the system enables to conduct private video calls while holding the phone further from the ear. Also the system enhances phone usability and provides substantial reduction on near-skull electromagnetic radiation. In addition, the system may be used in various electronic devices to privately provide notifications which are addressed thereto (e.g. incoming-call rings, message alerts and instructions).

The system may be implemented as computer readable code which is capable of operating designated sound/acoustic systems including certain designated hardware components such as a digital signal processing (DSP) module and an acoustic transducer system (e.g. transducer array) capable of generating ultrasonic sound. The sound system of the invention may be embedded or included in various electronic devices such as mobile phones, tablets, TVs etc. The system can also be implemented as a stand-alone system, and may be configured for receiving audio input by utilizing data communication with an internal/external audio data source.

BRIEF DESCRIPTION OF THE DRAWINGS

In order to understand the disclosure and to see how it may be carried out in practice, embodiments will now be described, by way of non-limiting example only, with reference to the accompanying drawings, in which:

FIGS. 1A and 1B illustrate the principles of demodulation of ultrasound beams by a non linear medium as known in the art;

FIGS. 1C and 1D graphically illustrate the SPL profile of a directional ultrasound beam formed by conventional techniques utilizing parametric arrays;

FIGS. 1E to 1G graphically illustrate the SPL profiles of a focused ultrasound beam formed by conventional techniques utilizing phased arrays;

It should be noted that similar reference numerals are used in the figures to designate modules and/or method operations associated with similar functionality.

DETAILED DESCRIPTION OF EMBODIMENTS

Figure 2:
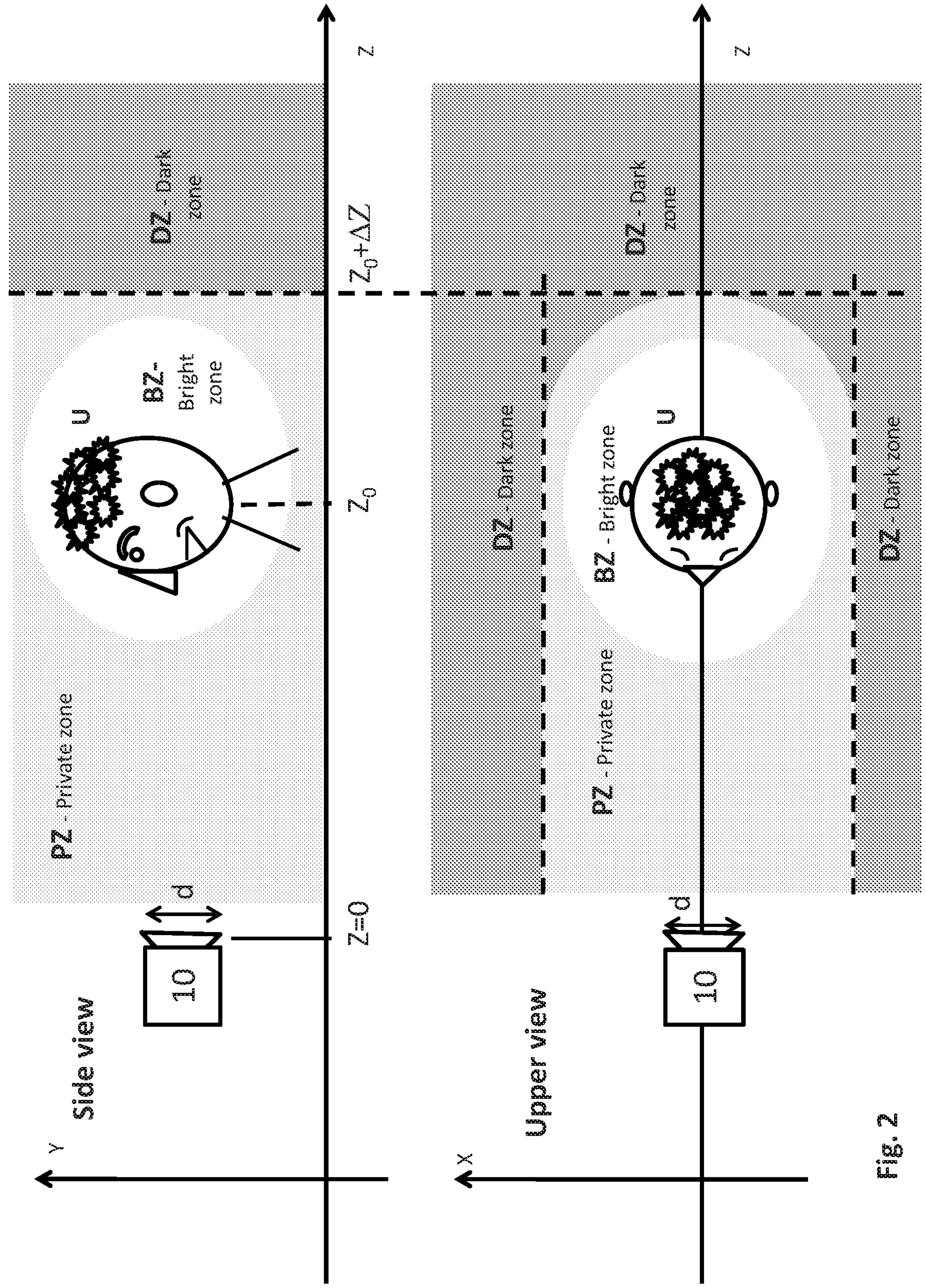
FIG. 2 is a schematic illustration showing top and side views of a localized sound field generated utilizing the technique of the present invention.

Reference is made together to FIGS. 1A and 1B schematically illustrating the known principles of the demodulation of ultrasound beams by a non linear medium. Transmitting high frequency acoustic/sound wave (ultrasound) with high sound pressure level (SPL) causes air molecules to behave in a non-linear fashion—the higher the amplitude, the faster the molecule moves. Accordingly, as illustrated for example in FIG. 1A, an input (ultrasonic) sine wave signal $S_0$ with sufficiently high SPL, which propagates through a non-linear medium, produces harmonics in a predicted way and typically acquires the shape of a saw-tooth wave $S_m$. In case two ultrasound waves with respective frequencies $f_1$ and $f_2$ are transmitted, the air nonlinearity behavior will demodulate the signal and produce the following output and harmonics:

(1) Native frequencies $f_1$ and $f_2$;

(2) Harmonics $nXf_1$ and $mXf_2$ (n and m being integer numbers);

(3) The sum of the frequencies $f_1+f_2$; and (4) The difference of the frequencies $|f_1-f_2|$.

For example FIG. 1B illustrates schematically the results of a concurrent transmission of two ultrasound signals/waves with respective frequencies $f_1=40$ KHz and $f_2=42$ KHz through a non-linear medium (air in this case). The air propagates the 40 and 42 KHz frequencies, but also produces the following frequencies: 80 and 84 KHz (the harmonics), 82 KHz (the sum) and 2 KHz (the difference). However, only the later frequency $|f_1-f_2|=2$ KHz is audible (i.e. heard by humans) as the rest of the frequencies are in the ultrasound regime. Modulating a carrier frequency in the ultrasonic regime (e.g. with frequency $f_1=40$ KHz) may be amplitude modulated at the input (e.g. utilizing Double Side Band Amplitude Modulation—AM-DSB) with an audible tone (for example single tone at 2 KHz), which will create the spectrum lines of 40 KHz and 42 KHz (also 38 KHz as this is double side band modulation) in the frequency domain. Based on the self demodulation characteristic of the air/non-linear medium, the AM modulated signal will be demodulate to reproduce the 2 KHz tone which the human ear can hear (typically also producing the native frequencies, harmonics, and sum of the native frequencies).

Some conventional devices, which are based on the non-linear demodulation effect of non-linear medium for generation of audible sounds, utilize Parametric Array of ultrasound transducers for generating a very directional ultrasound beam. In such parametric arrays, generally, many ultrasonic transducers/emitters are fed in parallel configuration with signals having the same amplitude and phase. FIGS. 1C and 1D are respective schematic illustrations of the beams (main beam and side lobes) and the SPL profile along the main beam obtained from a typical parametric array configuration. As shown in FIG. 1C, the parametric array configuration typically results in a very directional main beam DMB and with sidelobe beams SL. FIG. 1D is a schematic illustration of two graphs, PA-US and PA-AS, respectively depicting the change in SPL levels of the ultrasound and audible-sound-from-ultrasound along the direction of propagation Z of the main beam DMB illustrated in FIG. 1C. The decay of the audible-sound-from-ultrasound (the audible sound coming out of a modulated ultrasonic beam) illustrated in PA-AS is actually very slow, and some experimental systems were able to direct audio beams to distances of over 1000 m, yet having SPL>80 dB. In fact, parametric arrays may yield a very directional audible sound beam where the sound level is dropped by a 3 dB over twice the distance (referred to as 3 dB over twice the distance drop). For example, in case SPL of 75 dB is measured at 1 meter from a parametric array, in 2 meters the SPL measured will be 72 dB. This may be expressed as $$\theta_{-3dB} = \frac{4}{\sqrt{K_d}\, R_a}$$

where $\theta_{-3\ dB}$-half power −3 dB angle in Radians, $K_d$-wave number, $R_a$-absorption length of the medium. Neglecting side lobes that might arise, the decay audible sound beam emanating from the parametric array is typically slower compared to a conventional Omni-directional audio band speaker, which obeys the −6 dB over twice the distance drop e.g. an SPL of 75 dB measured at 1 meter from an Omni-directional audio source, which will be 69 dB at a distance of 2 meters from the source. Moreover, technologies based on the generation of directional acoustic beams generally operate properly in the far-field region (at distances beyond the Rayleigh distance), where the acoustic/sound waves are not influenced by the strong near-field interferences causing considerable amplitude fluctuations.

Thus, conventional techniques utilizing the parametric arrays generally provide a very directional audible beam having low rate of SPL decay along the direction of the beam. This is associated with high level audible sound at a wide range of distances from the transducer (the sound level may be audible and loud enough within a distance range which may be of several meters and up to a range greater than 1000 meters). Indeed the sound beam provided in this manner is very directional and the SPL level at regions located laterally aside the beam (with respect to the X and Y directions), is very low. However, generating a localized sound field utilizing such techniques is somewhat problematic, as the SPL decays slowly and steadily along the main beam DMB and therefore in case the main beam's SPL is high enough to be clearly heard in the vicinity of a user, it is remains loud a great distance from the user (with respect to the beam's direction of propagation), thus preventing the creation of a localized audible sound field near the user. Furthermore, once the beam hits a hard surface, the sound disperses, and the surface acts as a local speaker with Omni-directional behavior and may thereby impair sound localization.

Other types of conventional devices, which are based on the non-linear demodulation effect of non-linear medium for generation of audible sounds, utilize Phased Array of ultrasound transducers for generating a focused ultrasound beam which is focused on a certain location with respect to the Phased Array. Utilizing such Phased Array techniques, many ultrasonic transducers/emitters are fed with signals having different phases/amplitudes selected to cause constructive interference at the certain location at which sound should be focused. FIGS. 1E to 1G are schematic illustrations of three SPL profiles of respectively three focused beams which are respectively focused at three different distances from phased array transducers. The SPL profiles are taken along the Z axis representing the general direction between the phased array and the certain location at which the beams are respectively focused. FIG. 1E shows an ideal SPL profile of a beam focused at region/distance $Z_0$ very close to the phased array transducer. Specifically the distance $Z_0$ between the focal point and the transducer is of the order of the transducer size (width and/or height thereof). Here indeed a peak sound pressure level $P_0$ is obtained at $Z_0$ with only small lobes preceding or following $Z_0$. However, attempting to focus a sound beam at distances greater than the transducer size (i.e. greater by one or more order of magnitudes) generally results in a less ideal SPL profile, which is typically associated with a high SPL tail following the SPL peak and preventing the generation of a localized sound field. For example, FIGS. 1F and 1G show the SPL profiles of two beams focused at distances $Z_0$ substantially greater than the transducer size (e.g. about 5 times greater than the transducer), but at a distance within the Raleigh distance.

Referring to FIG. 1F it is noted that attempting to focus the beam at distance $Z_0$ substantially greater than the transducer size, results in practice with an actual sound pressure level peak $P'_0$ at distance $Z'_0$ preceding $Z_0$ (namely the pressure $P_0$ at $Z_0$ is lower than the pressure $P'_0$ at $Z'_0$ and $Z'_0<Z_0$) and also with an SPL tail developed after the distance $Z_0$ with low decay rate (slope proportional to 1/Z). This is due to the limited angular opening of the transducer array (the large ratio between the array diameter/size and the required distance $Z_0$) and due to the radial nature of wave propagation (where SPL drops in 1/Z rate) combined with relative high absorption of ultrasound in air. The low decay rate prevents efficient and accurate formation of a localized sound field. As shown in FIG. 1G, a focus of the beam at a new distance $Z_{0\text{-}new}$, which is greater than $Z_0$, with the purpose of getting the actual SPL peak $P'_0$ at $T_{0\text{-}new}$ which equals $Z_0$, generally results in substantially wider peak with longer tail, and consequently with poorer focusing of the sound beam.

According to various aspects of the technique of the present invention, it is aimed at the generation of a private sound zone, in which audible sound can be heard and its contents comprehended, while outside of which the audible sound is not heard (i.e. its SPL is below the audible sound level or below the surrounding noise level) or at least it is not comprehendible. This is achieved according to the present invention by providing a technique of generation of a localized audible sound field (also referred to herein as localized sound field) which is localized at a certain location with respect to the acoustic transducer. In addition, according to various aspects, the invention is aimed at enabling utilization of a compact acoustic transducer system (e.g. with characteristic dimension size between a few centimeters to several decimeters) for generating the localized sound field (i.e. audible) at a distance which may range from several times the characteristic size of the acoustic transducer system to several orders of magnitude above that characteristic size.

FIG. 2 shows a schematic illustration of the upper and side views of a localized audible sound field generated utilizing the technique of the present invention in the vicinity of a user U by utilizing a compact acoustic transducer system 10 whose characteristic size d is located at a distance $Z_0$ which is several times greater than the characteristic size d. In this connection, the term localized audible sound field may be understood as an audible sound field whose SPL is sufficiently high to be heard in the vicinity of a certain-region, referred to herein as bright region BZ (e.g. where a user or his head/ears is/are located), and low enough such that it is not heard or cannot be comprehended at regions, referred to herein as dark zone DZ regions located outside a private zone PZ surrounding the bright zone BZ. To this end, the localized audible sound field provided by the technique of the present invention is characterized by dark zone regions DZ located at least alongside the user (e.g. on the left and on the right with respect to the general direction Z of sound propagation from the acoustic transducer to the bright zone BZ) and beyond the user with respect to the general direction Z of sound propagation. In the dark zone regions DZ the SPL is low enough such that audible sound cannot be heard/comprehended. Enclosed by the dark zone regions DZ, at least from the left and right and from beyond, is a private zone PZ in which sound may be audible/comprehendible or not. The private zone may optionally extend between the designated location at which high SPL is to be provided (e.g. the location of the user) and the transducer system 10. The private zone is actually a boundary zone between the dark and bright zones, which is defined by the dark zone extent, and in which sound might or might not be audible. A bright zone BZ in which audible sound is clearly audible and comprehendible is defined within the private zone PZ (e.g. at a vicinity of a designated location at which a user is located). The bright zone BZ is practically enclosed by the dark zone DZ and may acquire any extent in the private zone PZ and may actually extend also between the acoustic transducer 10 and the designated location $Z_0$. However, according to the invention, the bright zone BZ is terminated after a reasonable distance $\Delta Z$ (e.g. $\Delta Z$ may be in the order of several decimeters and more preferably about 40 cm—being about shoulder length) after the designated location $Z_0$ with respect to the direction Z of sound propagation, and terminated after a reasonable distance (e.g. about shoulder length—40 cm) aside the designated location; e.g. with respect to the lateral X axis from the right and left of the designated location $Z_0$ and typically, but not necessarily, also with respect to the lateral Y axis from the top and bottom of the designated location. Alternatively or additionally, the dark zone DZ is defined after the same reasonable distances $\Delta Z$ from the designated location (e.g. 40 cm from the designated location and 40 cm away from the right and left of the designated location). In this connection it should be noted that in some embodiments the localized audible sound field may be audible at regions preceding the intended location $Z_0$, for example at regions between the location of the user U and the acoustic transducer system 10. In such cases, these regions are also considered within the private zone PZ.

To this end, the invention provides a system and a method for generating a localized audible sound field defining a private zone confined to the vicinity of the area between the designated location $Z_0$ and the acoustic transducer system 10, and in which one or more bright zone regions are included where clearly audible and comprehendible audible sound is produced, while outside of which a dark zone region is defined in which the sound is either not audible to the human ear, or its content cannot be clearly comprehended.

The conventional techniques disclosed above in FIGS. 1C to 1G, which utilize parametric and/or the phase arrays, are generally deficient in generating such localized audible sound fields. This is at least because the parametric array techniques produce sound/acoustic beams having slow decay which therefore cannot be confined to form a private zone of reasonable size, while the phased array technique which is based on the focusing of the sound field, requires an acoustic transducer system whose dimension is about as large as the distance from the system to the designated location on which the localized sound field should be focused, or otherwise a tail of substantial SPL is produced after the designated location.

Figure 3:
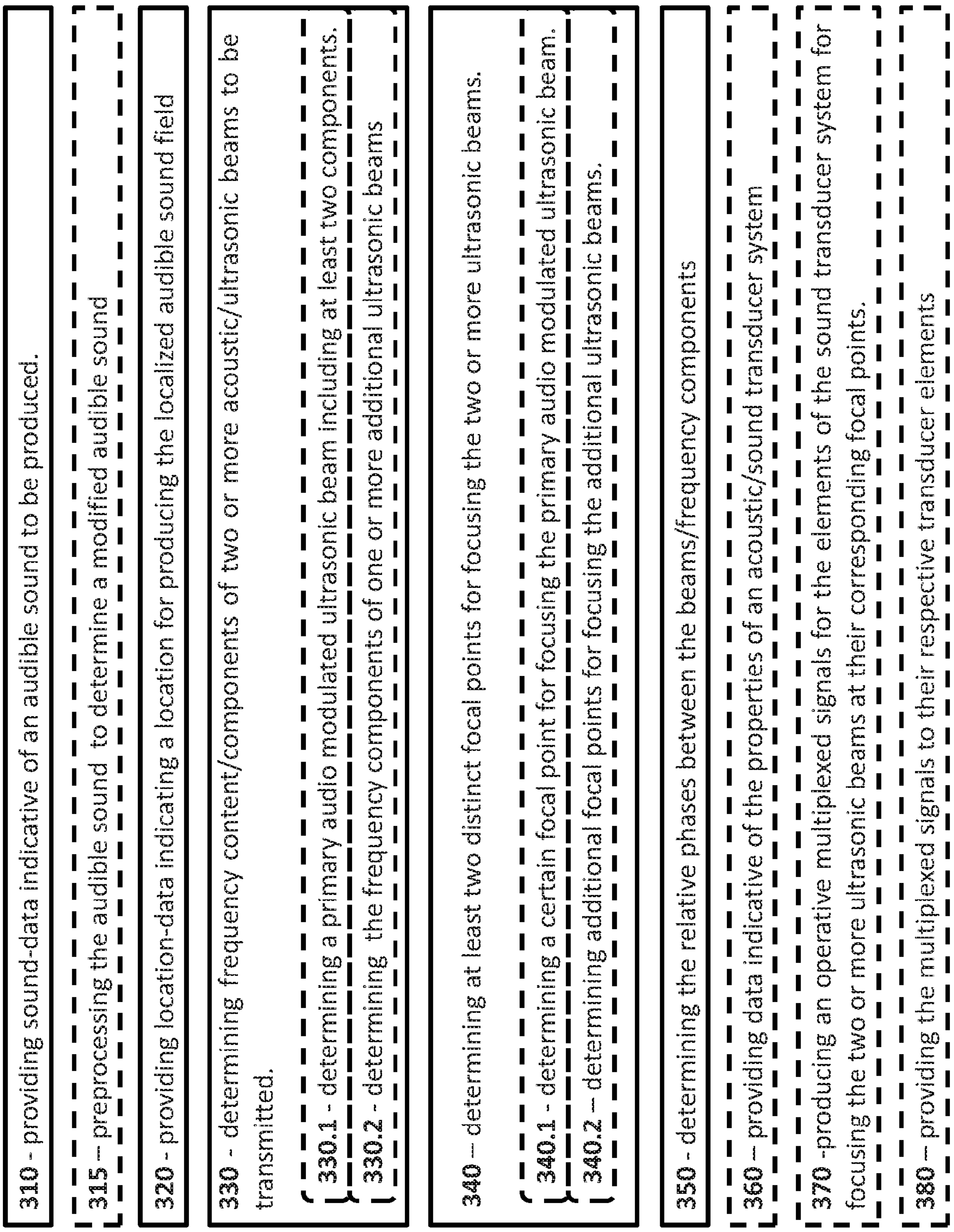
FIG. 3 is a flow chart illustrating a method for generating a localized audible sound field according to some embodiments of the present invention.

Reference is made to FIG. 3 illustrating schematically a method 300 according to some embodiments of the present invention for generating a localized audible sound field at a certain designated spatial location. Generally method 300 includes the following operations 310 to 350 which may be carried out sequentially or in any suitable order (in some cases some of these operations are repeated, while others may be performed only once):

310—providing sound-data indicative of an audible sound to be produced. The sound data may be an audio file and/or analogue or digital audio signal-representation for example received from a microphone and/or by streaming (e.g. from wireless/wired communication devices) and/or other representation of audio data. The sound data may also be dynamically received (i.e. in real time) and/or it may be static data. According to some embodiments of the present invention the sound-data is divided into packets/time frames and the method 300 is performed for each packet/time-frame based on the audible frequency content included therein.

320—providing location-data indicative of a designated spatial location at which that audible sound should be produced. The location data may be provided by any suitable digital and/or analogical representation and may be associated with fixed (e.g. hardcoded/static data and/or dynamic/changing) location data. The location data may for example be indicative of absolute or relative coordinates with respect to the acoustic transducer system to be used for generating the localized audible sound field. In some cases for example, the location data may be dynamically provided for example from a tracking device which tracks (e.g. in real time) the location of a user or his head.

330—utilizing the sound-data and determining frequency content of two or more ultrasonic beams to be transmitted by an acoustic transducer system including an arrangement of a plurality of ultrasound transducers for generating the audible sound indicated by the sound-data (e.g. by a packet/time-frame of that data). The frequency contents determined in this stage include two or more ultrasonic frequency components of a primary audio modulated beam. These two or more ultrasonic frequency components are selected to produce the desired audible sound after interacting with (i.e. propagation through) a non linear medium such as air. In addition, the frequency contents determined in this stage may include one or more ultrasonic frequency components that are associated with one or more of the above mentioned additional beams used for modifying the SPL of the primary audio modulated beam. It should be understood that frequency content determined in 330 may in some cases be dependent on the location-data and more specifically on the distance between the transducer and the user/designated location at which the localized audible sound field should be produced. In other words, as the audible sound is produced due to non linear interaction with the medium between the transducer and the designated location, the duration/length of this interaction may be taken into account during operation 330 when determining the frequency content required for creating a certain audio.

340—utilizing the location data and determining spatial locations of at least two distinct focal points such that each focal point is associated with a focus location of at least one of the two or more ultrasonic beams (e.g. whose frequency components were determined in 330). The distinct focal points are selected such that focusing the two or more ultrasonic beams to the at least two distinct focal points associated therewith enables generation of a localized audible sound field with audible sound in the vicinity of the designated spatial location by causing appropriate constructive and/or destructive interference at various locations surrounding the designated spatial location.

350—determining the relative phases that should be attained between the two or more ultrasonic beams (e.g. relative phases between corresponding frequency components of these beams) and possibly also determining the respective amplitudes of those beams/frequency-components providing the desired interference pattern. In this connection it should be noted that frequency components having similar frequency may be included in two or more ultrasound beams/waveforms which are focused at two or more distinct focal points. Such frequency components having similar frequency may have the same or different phases which may be selected in accordance with the desired interference pattern that should be attained for eventually improving the SPL shape of the audible sound. It should be understood that, at this stage 350, the relative phases between different ultrasonic-beams (or between corresponding frequency components therein) are determined in order to enable production of localized audible sound. In the following optional operations 360 to 380, which relate to beam forming, the relative phases by which a each of the frequency components of the beams is transmitted by the elements of the transducer may be determined in order to focus the beams on the above determined focal points.

Optionally, the method further includes the following operations 360 to 380 aimed at the production of appropriate operative signals to be provided to an acoustic transducer system for generating a multiplexed sound/acoustic waveform/beam compound of the frequency components of the two or more beams focused on their associated locations and optionally having the appropriate phase differences between them, such that they form the localized audible sound field with the desired audible sound at the designated spatial location.

In optional operation 360 data indicative of the properties of an acoustic transducer system including an arrangement/array of plurality of acoustic transducers is provided/obtained and/or received. The acoustic transducer system data/properties may be indicative of the number of acoustic transducers/emitters included in the arrangement/array of the acoustic transducer system and the geometry of the arrangement/array (e.g. the membrane size of the acoustic transducer elements, the distance between them and/or their relative locations). This data may be hardcoded data associated with a certain predetermined acoustic transducer system and/or it may be non-static data which is obtained in relation with the particular acoustic transducer system which is to be used. In some cases not all the elements of a certain transducer system are necessarily activated but only a sub set of them may be activated.

In optional operation 370 focus forming processing (e.g. utilizing beam shaping techniques) is performed by utilizing the acoustic transducer system data/properties provided in 360 together with properties/frequency-components of the two or more beams determined in 330, the at least two distinct focal points associated with the beams as determined in 340 and the relative phases between corresponding frequency components of these beams as determined in operation 350. The focus forming processing may be carried out in accordance with any suitable beam forming technique as known in the art for producing operative multiplexed signals, each of which is associated with one of the acoustic transducer elements of the acoustic transducer system and includes a multiplex of one or more of the frequency components with phases and possibly also amplitudes adjusted in accordance with the acoustic transducer system properties for generating (collectively by the entire acoustic transducer system) a multiplexed sound/acoustic waveform compound of the two or more beams with their frequency components focused on the corresponding focal locations of the beams and having the appropriate phase differences between them. Accordingly, in optional operation 380 the multiplexed signals may be provided to their respective transducer elements to affect the production of the localized sound field with the desired audible sound at the designated spatial location.

In this connection, it should be noted that in 370 the conventional beam-forming (focus forming) techniques may be used to focus the above described two or more ultrasonic beams (e.g. the primary audio modulated beam and the additional beams) on their respective focal points determined in 340 above. The frequency content focused on each of the focal points and/or the phase differences between the frequency components are selected to provide a desired interference pattern for canceling or suppressing the SPL tail which is obtained by the conventional focusing techniques.

In particular, according to some embodiments of the present invention, in operation 330 the frequency content of the ultrasound beams may be determined by carrying out at least one of the following:

330.1—determining an audio modulated ultrasonic (US) beam. The primary audio modulated ultrasonic beam, including at least two frequency components being a carrier ultrasonic frequency and a modulation ultrasonic frequency. The difference between a carrier ultrasonic frequency and a modulation ultrasonic frequency of the audio modulated ultrasonic beam corresponds to a frequency of the audible sound to be produced. This enables audible sound from ultrasound production of the audible sound by de-modulation of the audio modulated ultrasonic beam through its propagation through the non-linear medium. According to some embodiments of the invention, the audio modulated ultrasonic beam is an amplitude modulated (AM) beam.

330.2—determining a frequency content/component of one or more additional ultrasound beams directed for correction the SPL profile of the audible sound (e.g. correcting the shape of the profile along the Z direction being the general direction between the acoustic transducer system and the location at which the localized audible sound field should be generated).

Further, according to some embodiments of the present invention, in operation 340 the locations of at least two distinct focal points of the two or more beams (e.g. of their ultrasonic frequency components) may be determined by at least carrying out the following:

340.1—determining a certain focal point for focusing the audio modulated ultrasonic beam determined in 330.1. This certain focal point may actually be in the vicinity of the designated location ($Z_0$) at which the localized audible sound field should be produced (or in some embodiments it may be a nearby point or a different point). It should be noted that the focus point is not necessarily at the designated location. A pressure peak may be produced at the designated location while focusing the audio modulated ultrasonic beam determined in 330 to a different location (e.g. somewhat further on the Z axis).

340.2—determining one or more additional focal points for focusing the one or more additional/corrective ultrasonic beams determined in 330.2. The additional focal points are selected such that when the audio modulated ultrasonic beam and the one or more additional ultrasonic beams are focused on the focal points corresponding thereto, a localized audible sound field with the desired audible sound may be produced at the desired spatial location. As noted above, in some embodiments, the relative phase shifts between the one or more additional ultrasonic beams and the audio modulated ultrasonic beam are properly determined in 350 to affect the desired profiling of the audible sound along the direction of propagation Z and/or to suppress/reduce an SPL tail past the desired spatial location.

In this connection, operation 370 may be carried out to determine a plurality of operative signals (multiplex signals) to be respectively provided to the plurality of acoustic transducer elements for generating the multiplexed sound/acoustic waveform compound of a modulated ultrasonic beam corresponding to the audio modulated ultrasonic beam focused at the certain focal point and one or more additional ultrasonic beams corresponding to the one or more additional ultrasonic beams focused at the additional focal points (i.e. phase shifted with the appropriate relative phase shifts). Indeed the audio modulated ultrasonic beam and the additional ultrasonic beams may be formed utilizing the same or different subsets of acoustic/sound transducers of the acoustic transducer system. These subsets may for example be distinct subsets.

For clarity, in the description of operations 330 and 340, above and below, there are references to well known amplitude modulation techniques such as DSB-AM and SSB-AM (e.g. LSB and USB) which are considered when determining the frequency content of audio modulated beams (e.g. primary and/or secondary audio modulated beams). It should be however noted that the audio modulated beams are in fact modulated according to the invention in a manner enabling the generation of a desired audible sound field by the non-linear medium/air demodulation properties. However, the functional operation of the non-linear medium/air demodulation is generally more complex than a simple SSB/DSB AM demodulation. For example, a non-linear signal demodulation function applied to high amplitude acoustic signals propagating in the air is approximated in Eq. 1 (the Berktay approximation) as follows:

$$P_0(t) = \frac{\beta p_0^2 r^2}{16\rho_0 c_0^4 z \alpha_0} \frac{d^2 E^2\left(t - \frac{z}{c_0}\right)}{d\left(t - \frac{z}{c_0}\right)^2} \quad \text{Eq. 1}$$

where $P_0(t)$ is the output pressure (the SPL is a logarithmic scale of a ratio between a base $p_0$ pressure normally chosen as the lowest pressure a human ear can detect and a measured pressure such as $p_0(t)$ of the Berktay approximation), $E(t-z/c_0)$ is the original audible sound signal which is typically used to form the envelope of the AM modulated signals, β is the air non-linearity coefficient, $p_0$ the initial sound pressure, r the radius of the effective acoustic transducer arrangement (e.g. in a parametric array with an arrangement of multiple transducer elements, r is the sum radius of all the transducer elements), $P_0$ is the air density, $c_0$ is the speed of sound in air, z is the axial distance along the general direction of the beam propagation, $\alpha_0$ is the absorption coefficient in air and t is time. In a simpler form, the Eq. can also be rewritten as follows:

$$P_0(t) = K\frac{d^2 E^2(\tau)}{d\tau^2} \quad \text{Eq. 2}$$

where E(τ) is the original sound signal and K is constant. To this end the resultant output pressure $P_0(t)$ is proportional to the second derivative of the squared input signal E(τ).

Therefore, in many cases, using the plain DSB and/or SSB AM modulations scheme may result in an un-flat spectrum response (un-flat frequency response) in which the audible SPL may differ significantly for different audible frequencies and also inter-modulations distortions may arise from frequency components produced as an artifact of the non-linear signal demodulation function of the medium. This may cause significant distortions to the audible sound generated in the localized sound field.

Thus according to some embodiments of the present invention more complex types of SSB and/or DSB AM modulation schemes may be used in order to avoid/reduce such distortions. Specifically, in the plain SSB/DSB AM modulation, one or more modulation frequencies are selected and superimposed with the carrier frequency to form a beam/waveform having the carrier frequency with an amplitude envelope oscillating in the frequency(ies) of the audible signal (i.e. an envelope having the form of E(τ). However, in some cases, as in case of a composite audio signal (e.g. where the original sound data/signal E(τ) has multiple frequencies), the original sound signal E(τ) may optionally be preprocessed (e.g. before operation 330) in order to determine a modified audible sound data to be used for creation of the primary audio modulated ultrasonic beam and possibly also the additional ultrasonic beam.

An example of such a preprocessing of an audible sound data/signal, which is aimed at creating a modified audible sound data resulting in more faithful Sound from ultrasonic replication of the original sound data (e.g. with reduced distortions), is illustrated in optional operation 315 of method 300. It is noted that operations 320 to 380 of method 300 may then be carried out similarly to those described above, but on the modified audible signal/data. This would, in some cases, yield a localized audible sound field with a more accurate representation of the original audio data. Specifically the conventional/plane SSB/DSB AM modulations may be carried out on the basis of the modified audible signal/data. To this end, the terms referring to types of AM modulation mentioned herein above and below (e.g. the SSB and/or DSB modulation schemes) should be construed as referring to plain AM modulations of the original audio data and/or referring to more complex modulation schemes of the original audio data (e.g. according to which the original data is preprocessed and/or modified prior to the SSB/DSB AM modulation).

It should be noted that according to the invention, modulation techniques, other than AM modulation, may also be used resolving the ultrasonic frequencies components needed for creating a localized sound field with the desired audio content. For example, in some embodiments, a modulation technique such as handling discrete ultrasonic frequencies is used instead of the AM modulation.

According to some embodiments operation 315 includes performing signal processing operations which are equivalent to double integration and square-root of the original audio data/signal E(τ) to generate the corrected/modified audio data/signal E'(τ) which is to be further used for the AM modulation. Thus the modified audio data/signal E'(τ) (e.g. the envelope of the modulation) may be as in Eq. 3 where m is the modulation index, E(t) is the original sound signal:

$$E'(t)=\sqrt{1+mE(t)} \quad \text{Eq. 3}$$

The term modulation index m refers to a measure of the amplitude variation surrounding an un-modulated carrier which is also known in the art as "modulation depth".

Method 300 may be used to produce a localized sound field associated with bright zone(s) in which the SPL of the audible sound exceeds a predetermined bright sound threshold. The bright zone may extend not more than a certain predetermined distance (e.g. 0.4 meters) from the designated spatial location with respect to a general direction Z. According to some embodiments of the invention a bright sound threshold criterion may be selected such that a signal to noise ratio (SNR) of audible sound in the bright zone is about 0 dB. Alternatively or additionally, the bright sound threshold criterion may be selected such that the SPL of audible sound in the bright zone exceeds 70 dB. Yet alternatively or additionally according to various embodiments of the invention, a bright zone threshold criterion may be selected as a state satisfying both the above criteria and/or satisfying at least one of them. The localized sound field is also associated with dark zone(s) located outside the bright zone(s) and in which the SPL of the audible sound is lower than a predetermined dark sound threshold. According to some embodiments, the dark sound threshold is selected such that SPL of the audible sound is lower than an SPL of the audible sound at the designated spatial location $Z_0$ (e.g. at the bright zone) by at least 10 dB (in some cases this bar is raised to at least 20 dB). According to some embodiments, the dark zone is located at a distance not exceeding several decimeters from the designated location $Z_0$ (e.g. up to 0.4 meters therefrom) thus enabling creation of a private zone in the vicinity of the designated location.

Figure 4A:
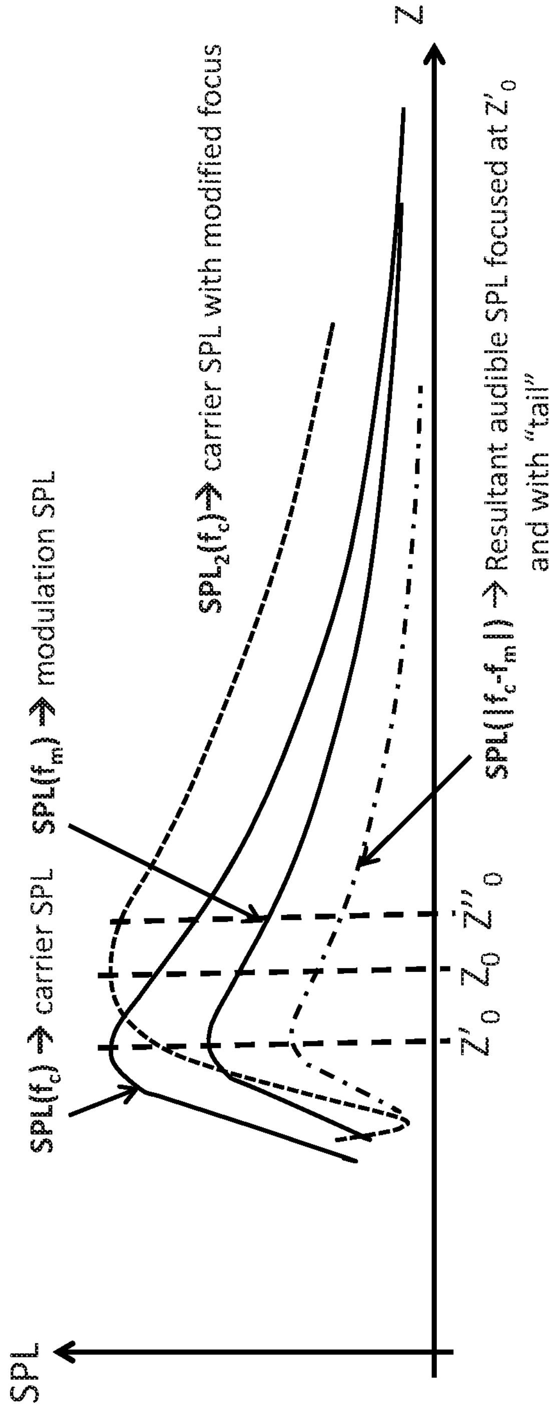
FIGS. 4A to 4E are graphical illustrations of the operation of the method of FIG. 3 for generating a localized audible sound field according to an embodiment of the invention.

Reference is made together to FIGS. 4A to 4E. FIG. 4A schematically illustrating the problems associated with creating a localized sound field by conventional sound from ultrasound production. FIGS. 4B to 4E schematically illustrate the operation of method 300 according to some embodiments of the present invention.

Turning to FIG. 4A there is illustrated the SPL graphs of the frequency components of a conventional audio modulated ultrasound beam produced according to the conventional approach by focusing a carrier frequency component $f_c$ in the ultrasonic region and a modulation frequency component $f_m$ in the ultrasonic regime towards a desired location $Z_0$. Typical SPL graphs SPL($f_c$) and SPL($f_m$) of such focused components as a function of the distance along the general direction Z are illustrated in FIG. 4A. As can be readily seen from the figure and also as noted above with reference to FIGS. 1E to 1F, focusing these components on $Z_0$, which is a few times or more larger than the characteristic size of the acoustic transducer system/array, results in an actual peak at a different location $Z'_0$ wherein $Z'_0=Z_0-\Delta$ (delta being typically a certain positive distance) and also results in a tail of substantial SPL following the peak at $Z'_0$. In view of these phenomena, the audio SPL (graph SPL($|f_c-f_0|$)) which is obtained due to the non linear interaction between the carrier and modulation ultrasonic frequency components ($f_c$ and $f_m$) in the non-linear medium, is also incorrectly focused. However, when trying to obtain the SPL peak at the correct location ($Z_0$) by focusing these frequency components on a different distance/location (e.g. at a certain $Z''_0$) a far larger SPL tail is developed causing the audible sound field to be smeared and not localized (in general, different frequencies may be associated with different focusing locations $Z''_0$ to which they should be focused to obtain an actual peak at the desired $Z_0$). For example, graph $SPL_2(f_c)$ showing a modified SPL of the carrier frequency component which is developed by focusing this frequency component to $Z''_0$. Indeed the actual peak is now at the correct location $Z_0$, but the peak and the SPL tail are substantially wider, thus preventing localization of the sound field. To this end, carrier and modulation ultrasonic frequency components ($f_c$ and $f_m$) are focused on appropriate locations (e.g. $Z''_0$) such that the SPL of the resulting audio field has a peak at the correct/designated spatial location. Indeed, the SPL profile of the resulting audio field may still have a substantial SPL tail, and thus the audible sound is not localized.

Method 300 of the present invention is inter-alia aimed at solving this problem of incorrect focusing and extended tail which are not solved by conventional focusing/beamforming techniques of audible sound from ultrasound generation. This is achieved according to certain embodiments of the invention by correcting the actual SPL peak position of at least one of the ultrasonic components of the primary audio modulated beam to be at the correct spatial location $Z_0$ (e.g. by focusing that frequency component on a different location $Z''_0$). Then, the extended tail of that beam is suppressed by utilizing additional/corrective ultrasonic beam(s)/frequency-component(s). The corrective ultrasonic beam(s) destructively interfere with at least one frequency component of the primary audio modulated beam to reduce/suppress its SPL tail. Specifically, the corrective ultrasonic beam is typically focused on a different focal point such that the shape of its SPL profile can be used to interfere and cancel/reduce the SPL tail.

Figure 4B:
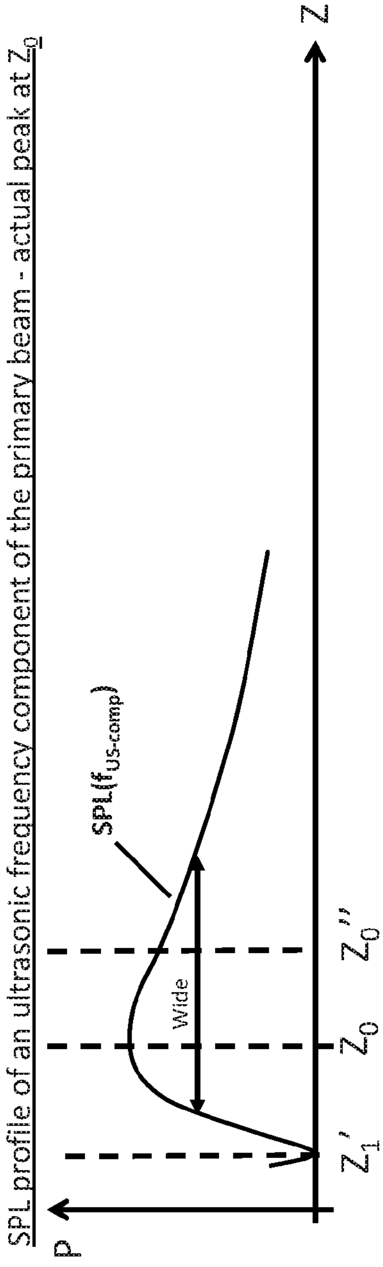

Referring to FIG. 4B there is illustrated an SPL graph SPL($f_{US\text{-}comp}$) indicating the SPL development of an ultrasound component of one of the carriers and/or modulation frequency components of the primary audio modulated ultrasonic beam whose actual peak is at $Z_0$ (e.g. the beam is focused to $Z''_0$). As seen, the actual SPL peak is obtained at $Z_0$. Reviewing the structure of the graph SPL($f_{US\text{-}comp}$) reveals a dip located at location $Z'_1$ which precedes $Z_0$. The present invention, according to some embodiments thereof, exploits this structure of the SPL graph/development of ultrasonic beams to produce an additional/corrective ultrasonic beam/frequency-component interfering with at least one frequency component of the primary audio modulated ultrasonic beam to produce an interference pattern that enables to correct and/or improve the location and/or width of the actual focus/peak of the primary audio modulated ultrasonic beam and/or to suppress its SPL tail. This corrective ultrasonic beam which is adapted to suitably interfere with one or more ultrasonic components of the primary audio modulated ultrasonic beam is referred to in the following as a primary corrective ultrasonic beam. The primary corrective ultrasonic beam enables formation of a better localized sound field with narrower and more accurate focus and with a suppressed SPL tail.

Figure 4C:
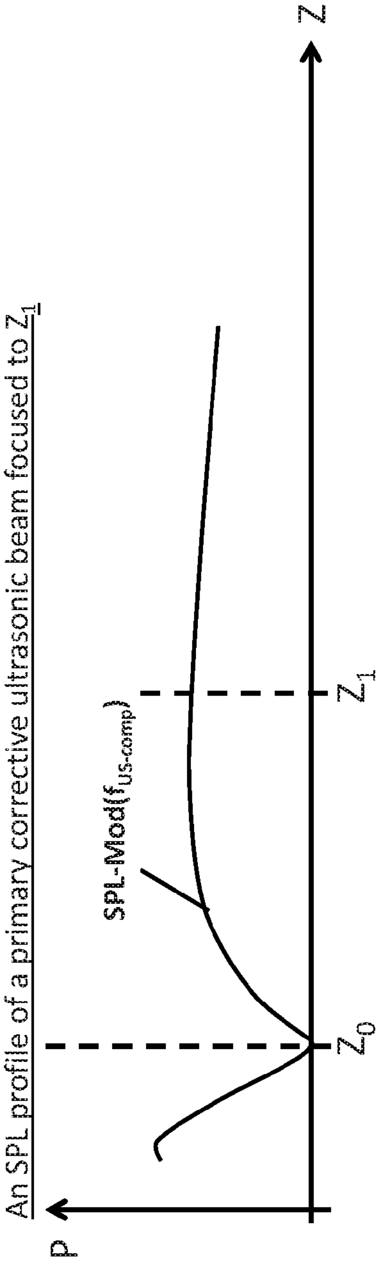
Figure 4D:
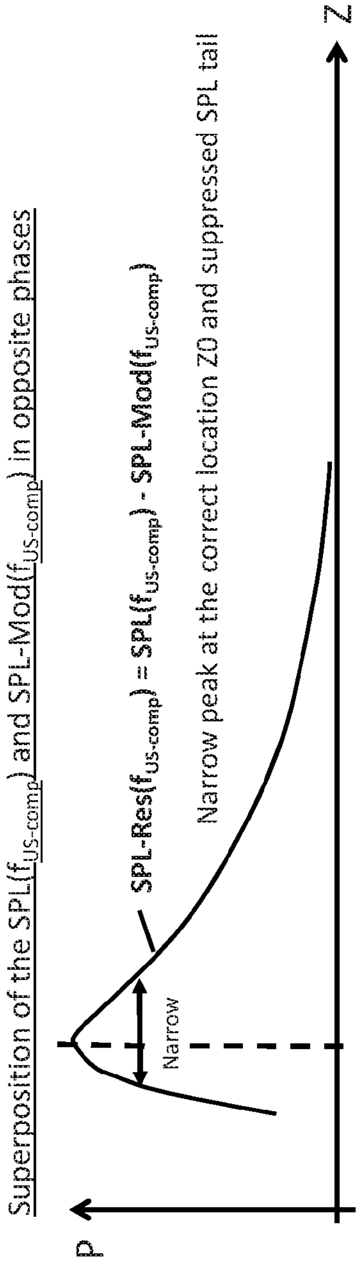

Referring for example to FIG. 4C, there is illustrated an SPL graph, SPL-Mod($f_{US\text{-}comp}$), showing the SPL development of such a primary corrective ultrasonic beam. The primary corrective ultrasonic beam is adapted for generating a focused waveform/beam having the same ultrasonic frequency component $f_{US\text{-}comp}$ as a respective one of the carrier and/or modulation frequency components of the primary audio modulated ultrasonic beam but it is focused on a location $Z_1$ following the desired focus/peak location $Z_0$ of the primary audio modulated ultrasonic beam. As illustrated here, both the actual peak and the dip in graph SPL-Mod ($f_{US\text{-}comp}$) are wider than their counterparts in the graph SPL($f_{US\text{-}comp}$) of FIG. 4B. Actually the focus $Z_1$ of the primary corrective ultrasonic beam is selected such that the location of the dip falls in the vicinity (preferably on) the designated focusing location $Z_0$ of the primary audio modulated ultrasonic beam. Considering the structures of the graphs SPL($f_{US\text{-}comp}$) and SPL-Mod($f_{US\text{-}comp}$), it is evident that subtracting the SPL profile/graph illustrated in FIG. 4C from SPL profile/graph in FIG. 4B yields an SPL graph having narrower peak focused on the correct designated location $Z_0$ with a suppressed SPL tail following the focus. This is illustrated for example in FIG. 4D showing the SPL development SPL-Res($f_{US\text{-}comp}$) of an ultrasound waveform which is formed by superposition of the waveforms associated with SPL($f_{US\text{-}comp}$) and SPL-Mod($f_{US\text{-}comp}$) and with different (e.g. opposite) relative phases of these waveforms.

More specifically, the waveforms/beams SPL ($f_{US\text{-}comp}$) and SPL-Mod($f_{US\text{-}comp}$) have a common frequency (i.e. being associated with a carrier and/or a modulation frequency of the primary audio modulated ultrasonic beam) but they are respectively associated with and focused on different focal points (e.g. which are selected such that a dip of one waveform falls in the region/vicinity of the peak of the other waveform to enable sharpening of the peak of one of the waveforms at the correct/desired location $Z_0$ and suppression of the SPL tail). The phases of the waveforms/beams, SPL($f_{US\text{-}comp}$) and SPL-Mod($f_{US\text{-}comp}$), are typically different and in this example they are respectively opposite such that the SPL profile SPL-Res($f_{US\text{-}comp}$), of the ultrasonic waveform which results from the superposition of SPL($f_{US\text{-}comp}$) and SPL-Mod($f_{US\text{-}comp}$) is equivalent to the subtraction of SPL-Mod($f_{US\text{-}comp}$) from SPL($f_{US\text{-}comp}$), namely: SPL-Res($f_{US\text{-}comp}$)=SPL($f_{US\text{-}comp}$)−SPL-Mod($f_{US\text{-}comp}$).

Thus, according to various embodiments of the present invention, in operation 330 (e.g. in 330.2), the frequency content of one or more additional/corrective beams including at least one primary corrective ultrasonic beam is determined such as to enable focus correction and/or SPL tail suppression of the primary audio modulated ultrasonic beam. The frequency contents of the primary corrective ultrasonic beam may include frequency components associated with (i e similar to) the frequencies of any one or both of the modulation ultrasonic frequency and the carrier ultrasonic frequencies of the primary beam.

In some cases, two primary corrective ultrasonic beams are determined, one for correcting the SPL profile (e.g. its focus location, peak width and/or tail) of the carrier frequency of the primary audio modulated ultrasonic beam, and the other for correcting the SPL profile (focus location, peak width and/or tail) of the modulation frequency of the primary audio modulated ultrasonic beam. Alternatively or additionally a primary corrective ultrasonic beam, focused on a certain location (e.g. $Z_1$), may be composed of two or more frequencies, one can be similar to the carrier frequency and all other similar to modulation frequencies of the primary beams. To this end, there may be a need for only one corrective ultrasonic beam to interfere with more than one frequency component of the primary audio-modulated beam. Yet alternatively or additionally, since the audible sound is generated due to interaction between the carrier and modulation ultrasonic frequencies of the primary audio modulated ultrasonic beam, primary corrective ultrasonic beams may also be produced for correcting the SPL tail and/or peak width/location for only one of these carrier and modulation ultrasonic frequencies of the primary audio modulated ultrasonic beam. In other words, the generation of the localized sound field may be achieved by focusing correction ultrasonic beam(s) which is/are selected to cause substantial destructive interference with only one or more of the frequency components of the primary audio modulated ultrasonic beam. Specifically, in some embodiments of the present invention, the amplitude of the carrier frequency component of the primary audio-modulated ultrasonic beam is substantially greater than the amplitudes of the modulation frequency components of this beam. Accordingly, an appropriate primary corrective ultrasonic beam may include for example only one frequency component which has the carrier's frequency and whose properties (e.g. amplitude focal point and phase) are selected to effectively shape the SPL profile of the carrier frequency component of the primary beam.

To this end, it should be understood that in operations 330, 340 and possibly 350, the frequencies and amplitudes as well as the focusing position (focal points) on which to focus the frequency components of the primary audio modulated ultrasonic beam/waveform and the additional (e.g. focus correction) beams/waveforms and possibly their respective phase (or phase difference(s) between them) are selected for generating the desired localized audible sound field.

Figure 4E:
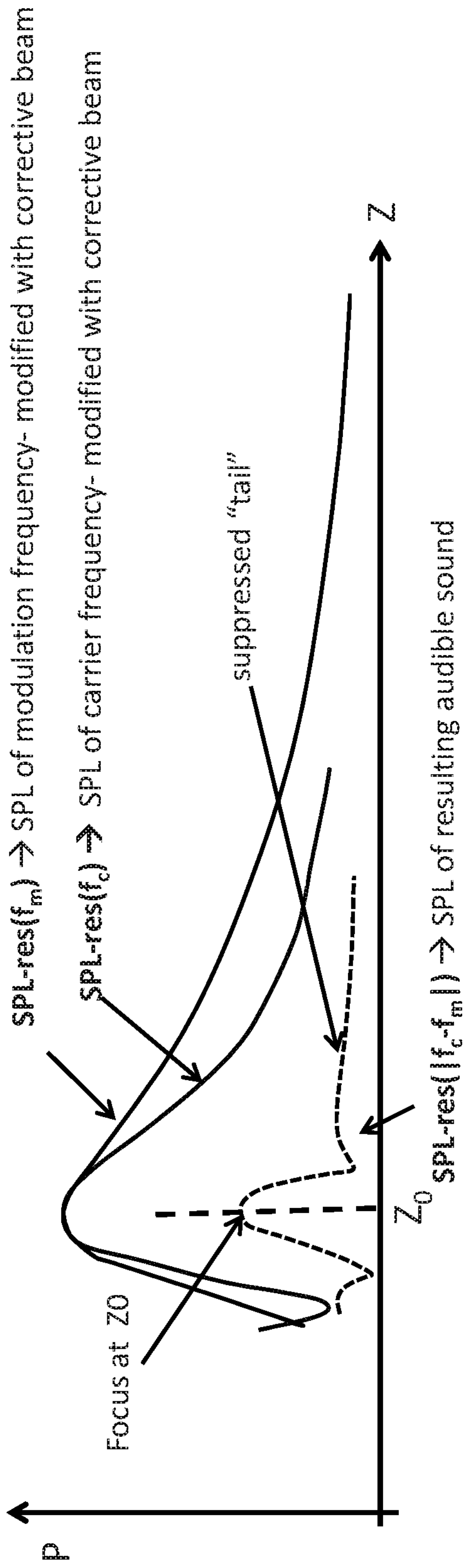

For example, referring to FIG. 4E there is illustrated the SPL graphs/profile of the frequency components of an audio modulated ultrasound beam produced according to the present invention by utilizing the primary audio modulated ultrasonic beam and a primary corrective ultrasonic beam that is adapted for improving the focusing and localization of the ultrasonic sound field of one of the ultrasonic frequency components of the primary audio modulated ultrasonic beam (in this example of the carrier frequency component $f_c$). In this example, the SPL graph/profile SPL($f_m$) of the carrier frequency component is similar to that illustrated in FIG. 4A. However the SPL graph/profile SPL($f_c$) of the carrier frequency component (illustrated in FIGS. 4A and 4B) is modified by utilizing superposition with the additional beams being a primary corrective ultrasonic beam (as shown in FIG. 4C) to improve the focus of this component and generate the modified/resultant profile SPL-Res($f_c$) illustrated in FIGS. 4D and 4E. The SPL profile SPL-Res ($|f_c-f_m|$) of the audible sound results from the interaction between the SPL profiles of two frequency components (carrier and modulation components) of the primary audio modulated beam as they are modified by two respective corrective ultrasonic beams Specifically, the SPL profile SPL-Res($f_c$), is the SPL of the carrier frequency component as modified by the primary corrective ultrasonic beam shown in FIG. 4E. The profile SPL-Res($f_m$) is the SPL of the modulation frequency component as modified by another primary corrective ultrasonic beam which has the same frequency as the modulation frequency and whose properties (e.g. focal point phase and amplitude) are selected in accordance with the above described principles of the invention (e.g. as those described in connection with FIG. 4E). The SPL profile SPL-Res($|f_c-f_m|$) resulting from the interaction between SPL profiles SPL-Res($f_c$) and SPL-Res($f_m$) modified according to the invention, is associated with improved focusing and reduced tail as compared with the audible SPL profile SPL($|f_c-f_m|$) illustrated in FIG. 4A. It should be understood that according to some embodiments, not all the frequency components of the primary audio modulated beams may be modified by the primary corrective ultrasonic beams and in some cases corrective ultrasonic beams may be used to modify the SPL of only the carrier frequency component and/or of only one or more of the modulation frequency components of the primary audio modulated beam.

In some case the primary audio modulated ultrasonic beam is modulated utilizing single-side-band AM modulation with a relatively strong amplitude of the carrier frequency component as compared with the amplitude of the modulation frequency components (which may typically be more than one e.g. in the case of an actual—non-single tone audio) thereby reducing the amount of total harmonic distortion (TDH) which may arise due to non-linear interaction (inter-modulation) between the spectral components.

According to some embodiments of the present invention, localization of the audible sound field may also be obtained by utilizing an additional/corrective beam of the type referred to above as secondary audio modulated ultrasonic beam. The secondary audio modulated ultrasonic beam may be used to correct the SPL profile of the audible sound generated by the primary beam and may serve instead of the above described primary corrective ultrasonic beam(s) or as an addition thereto for providing better refinement of the audible SPL produced. The frequency content (e.g. frequency components and their amplitudes and phases) of such a secondary audio modulated ultrasonic beam and its focusing point are selected to generate an additional/secondary audible sound waveform/field adapted to suitably interfere with the audible sound field generated from the primary audio modulated ultrasonic beam (e.g. by itself or after altering its SPL by the primary corrective ultrasonic beam). Specifically, the frequency content, phase and focal point of the secondary audio modulated ultrasonic beam are determined to improve the focusing and localization of the audible waveform generated from the interference between the audible waveforms produced by the primary audio modulated and secondary audio modulated ultrasonic beams (e.g. improving the accuracy of the location and/or width of the audible SPL peak and suppressing an SPL tail in the SPL profile of the resulting audible sound). In this connection, properties of any primary corrective ultrasonic beams, which might be used, are also considered when determining the properties (e.g. frequency content, phase and focal point) of the secondary audio modulated ultrasonic beam. For example, in some cases, the secondary audio modulated ultrasonic beam is used to further suppress or eliminate the tail in the audible SPL profile SPL-Res($|f_c-f_m|$) which is obtained utilizing the technique described with reference to FIGS. 4B to 4E.

Thus, according to some embodiments of the present invention the one or more additional/corrective beams of the present invention may include at least one secondary audio modulated ultrasonic beam, whose properties are selected to apply noise cancelation by creating an audible sound field/waveform properly interfering with the audible sound field/waveform of the primary beam to generate the localized sound field near or at the designated location $Z_0$. Typically, this goal is achieved by focusing the primary and secondary beams at different locations. Specifically, according to some embodiments, the properties of the primary and secondary audio modulated ultrasonic beams are selected such that the primary and secondary audible waveforms produced therefrom interfere destructively at least in some regions outside a desired bright zone in the vicinity of $Z_0$ thereby providing noise cancelation in those regions to form dark zones thereat.

In such embodiments, operation 330 of method 300 may include: determining an additional/secondary modulation ultrasonic frequency and an additional/secondary carrier ultrasonic frequency for the secondary audio modulated ultrasonic beam. The secondary modulation and carrier ultrasonic frequencies may be selected such that the difference between them corresponds to, or equals, the frequency of the audible sound which is to be generated (e.g. the frequency content of both the primary and secondary audio modulated ultrasonic beams/waveforms are selected to enable audible sound from ultrasound production of the desired audible sound—i.e. by de-modulation of each of the primary and secondary audio modulated ultrasonic beams through their propagation through a non-linear medium).

Figure 5A:
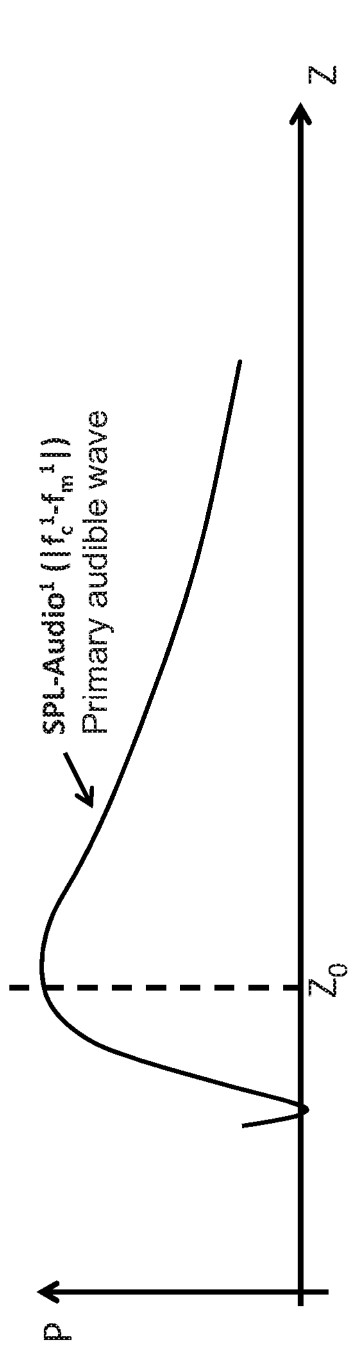
FIGS. 5A to 5C are graphical illustrations of the operation of the method of FIG. 3 for generating a localized audible sound field in another embodiment of the invention.
Figure 5B:
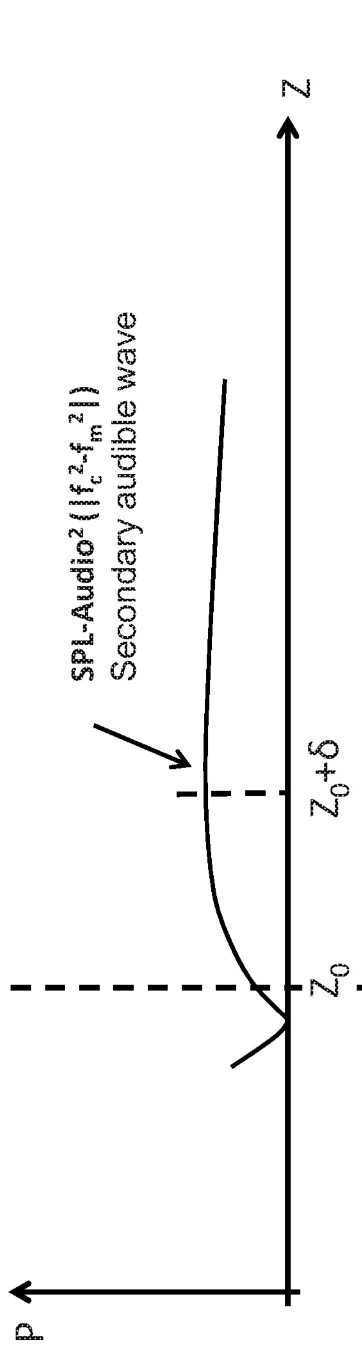
Figure 5C:
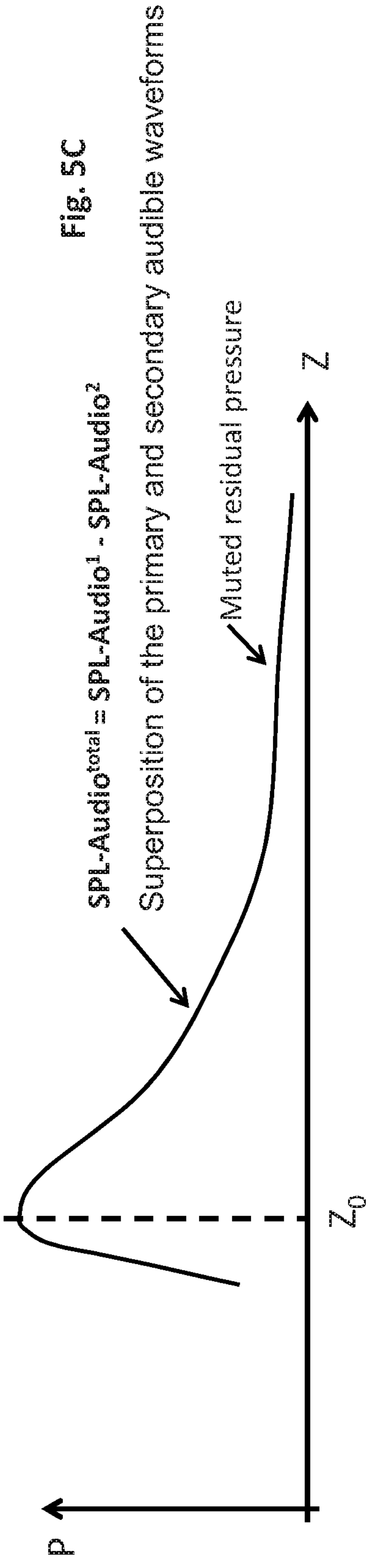

For example, FIGS. 5A and 5B are two SPL graphs respectively illustrating two audible SPL profiles, SPL-Audio$^1$($|f_c^1-f_m^1|$) and SPL-Audio$^2$($|f_c^2-f_m^2|$) of an audible waveform produced by demodulation of primary and secondary audio modulated ultrasonic beams of the invention during their interaction with a non-linear medium such as air. FIG. 5C is a graph illustrating the effective audible SPL profile SPL-Audio$^{total}$ resulting from the superposition (e.g. interference) of the primary and secondary audible SPL profiles, SPL-Audio$^1$($|f_c^1-f_m^1$) and SPL-Audio$^2$($|f_c^2-f_m^2|$) in the medium/air. The primary and secondary audible waveforms indicated by the profiles SPL-Audio$^1$($|f_c^1-f_m^1|$) and SPL-Audio$^2$($|f_c^2-f_m^2|$) are produced with respectively different (typically opposite) phases. Although in many cases the phase difference is not constant along the Z axis and may be subjected to changes in the area closer to the acoustic transducer, it however becomes constant somewhat further away from the transducer. Therefore, the phases of the primary and secondary audio modulated beams (e.g. and/or the required difference between them) needed to provide a desired interference pattern, are in many cases calculated/determined by considering a point beyond the desired/designated spatial location $Z_0$ at which the localized sound field is to be produced. To this end, the effective audible SPL profile SPL-Audio$^{total}$, resulting from superposition of the primary and secondary audio modulated beams, is at least nearly equivalent to subtraction of the secondary audible SPL profile SPL-Audio$^2$($|f_c^2-f_m^2|$) from the primary audible SPL profile SPL-Audio$^1$($|f_c^1-f_m^1|$).

Additionally, according to the invention, the shape of the primary and secondary audible SPL profiles, SPL-Audio$^1$($|_c^1-f_m^1|$) and SPL-Audio$^2$($|f_c^2-f_m^2|$) as well as the respective phase difference between the waveforms associated therewith, are adjusted such that the superposition of these waveforms produces a desired localized sound field in the vicinity of the designated position $Z_0$. According to some embodiments, this is achieved by selecting the properties of the primary and secondary audio modulated beams such that an interference pattern is produced between them in which the actual focus/peak for the primary audible SPL profile SPL-Audio$^1$($|f_c^1-f_m^1|$) is located at the desired/intended location $Z_0$ (i.e. near which a localized audible sound field should be produced) and the actual focus/peak for the secondary audible SPL profile SPL-Audio$^2$($|f_c^2-f_m^2|$) follows $Z_0$ such that a dip exists in the vicinity of $Z_0$. Alternatively or additionally, this goal may also be achieved by using other interference patterns which may be obtained by selecting a different shape for the secondary audible SPL profile. Specifically, for example, a proper interference pattern may be obtained by generating a somewhat flat secondary audible SPL profile SPL-Audio$^2$($|f_c^2-f_m^2|$) (e.g. by focusing the secondary audio modulated ultrasonic beam to infinity for forming a substantially collimated beam) and setting the secondary beam amplitude to match the amplitude of the tail of the primary beam. Yet alternatively or additionally, the SPL profile of the secondary audio modulated beam may also be altered by utilizing a secondary corrective ultrasonic beams as has been described above and is further described below. This enables use of a wide range of interference patterns enabling accurate localization of the audible sound field and diminishes or substantially cancels the audible sound field at regions (dark-zones) surrounding $Z_0$.

In this connection, it should be noted that in order to appropriately control the shape and/or actual peak/focus of the primary audible SPL profile SPL-Audio$^1$($|f_c^1-f_m^1|$), an additional one or more corrective ultrasonic beams in the ultrasonic regime, such as that illustrated in FIG. 4C, may be used to correct the location of the focus of the primary audio modulated ultrasonic beam and/or to appropriately modify/adjust the shape of the audible SPL profile generated by the primary audio modulated beam together with the primary corrective ultrasonic beam. To this end, the primary audible SPL profile SPL-Audio$^1$($|f_c^1-f_m^1|$) may for example be generated utilizing a method similar to that discussed above with reference to FIG. 4D such that the ultrasonic SPL profile of at least one of its carrier and modulation frequency components is appropriately modified by utilizing the primary corrective ultrasonic beam. As a result, the effective audible SPL profile SPL-Audio$^1$($|f_c^1-f_m^1|$) of the primary audio modulated ultrasonic beam may be similar to SPL-res($|f_c-f_m|$) of FIG. 4E. Primary corrective ultrasonic beam(s) may thus be used to improve/adjust the shape/width and/or location of the SPL peak.

In a similar manner, the effective SPL profile SPL-Audio$^2$ ($|f_c^2-f_m^2|$) of the secondary audio modulated ultrasonic beam may be obtained by utilizing additional ultrasonic beam(s), referred to herein as secondary corrective ultrasonic beam(s) to modify/adjust the shape of the SPL profile SPL-Audio$^2$($|f_c^2-f_m^2|$) and/or the location and width of its peak/dip. In this regard, the audible SPL profile may be obtained, utilizing the same principles used for generating the audible SPL profile SPL-res($|f_c-f_m|$) of FIG. 4E, although these principles may be used for providing different shape modifications to the secondary audible profile.

Thus, in embodiments where the frequency content of a secondary audio modulated beam is determined in 330, operation 340 may include determination of focal points for focusing the audio modulated ultrasonic beam (primary) and the additional/secondary audio modulated ultrasonic beam such that super positions between the primary and secondary improve the localization of the resulting sound field near $Z_0$. Also in optional operation 350 the relative phase difference between the primary and secondary audio modulated ultrasonic beams may be determined, causing distractive interference between audible sound/waveforms produced thereby at least in some regions (dark zones) in which the localized sound field should diminish As noted above in some cases, the one or more additional ultrasonic beams, whose properties are determined in 330, may also include at least one secondary corrective ultrasonic/beam that is associated with correcting/altering the SPL profile of the secondary audio modulated ultrasonic beam such that the latter provided better noise cancelation by interfering with the primary audio modulated ultrasonic beam. Thus, in this case operation 330 includes determining one or more parameters of the secondary corrective ultrasonic beam(s) in order to enable application of profile correction for adjusting the spatial audible SPL profile of the secondary audio modulated ultrasonic beam to provide better control over the shape of this profile and/or better accuracy in utilizing a secondary audio modulated ultrasonic beam for cancelling certain portions of the audible sound generated from the primary audio modulated ultrasonic beam. In some cases, the one or more parameters of the secondary corrective ultrasonic beam(s) include one or more of the following: in operation 330, determining frequency content of at least one secondary corrective ultrasonic beam(s); in operation 340, determining focal point for the secondary corrective ultrasonic beam(s); in optional operation 350, determining a relative phase shift (typically phase shift of $\pi$ being an opposite phase) between the secondary corrective ultrasonic beam(s) and the secondary audio modulated ultrasonic beam.

In view of the above, it is understood that the present invention utilizes at least one audio modulated ultrasonic beam (primary audio modulated ultrasonic beam) and an additional one or more US beams for producing a localized sound field at a desired location ($Z_0$). The one or more additional ultrasonic beams are typically focused at different focal points and have different relative phases which are selected to improve the shape of the effective audible SPL profile resulting from the super position of the primary and additional beams The one or more additional ultrasonic beams may include one or more of the following:

(I) one or more primary corrective ultrasonic beams, which are selected to interfere with one or more ultrasonic frequency components of the primary audio modulated ultrasonic beam for correcting/adjusting the shape of the SPL profile of these frequency components;

(II) one or more secondary audio modulated ultrasonic beam(s) selected for producing audible waveforms interfering with the audible waveforms which are generated by the primary audio modulated ultrasonic beam (e.g. possibly generated together with the primary corrective ultrasonic beams) for improving the localization and/or shape of the resulting audible SPL profile;

(III) In the latter case (II), where secondary audio modulated ultrasonic beam(s) are used, one or more secondary corrective ultrasonic beams may also be used and may be selected to interfere with one or more ultrasonic frequency components of the secondary audio modulated ultrasonic beams for correcting/adjusting the shape of their SPL profile and thereby refine the shape of the resulting secondary audible SPL profile, thus improving noise cancelation provided by the secondary audio modulated ultrasonic beam.

It should be noted that the term ultrasonic beams may generally refer to data/signals, which are determined/generated by the method/system of the invention, and which are indicative of properties of these beams such as their frequency content (spectrum) (amplitude and phases of their frequency components) and their focal points on which they should be focused for producing, together, the localized sound field. Also, it should be noted that the term beam is used herein to designate a collection of one or more frequency components which are focused on a certain location/focal point. To this end, according to some embodiments, the beams used in the present technique may each be associated with a certain distinct focal point/distance on which they should be focused.

According to some embodiments of the invention the focal point of a corrective ultrasonic beam (e.g. primary and/or secondary corrective ultrasonic beams) is followed by the focal point of the audio modulated ultrasonic beam by which the SPL profile should be corrected (e.g. being respectively a primary and/or secondary audio modulated ultrasonic beam). Namely, the focal point of the corrective beam is located after the focal point of the beam to be corrected with respect to a general direction from an arrangement of acoustic transducers that produce the beams, such that a dip of the corrective beam is typically located near/at the bright-zone region. Also in embodiments utilizing both the primary and secondary audio modulated beams, the secondary audio modulated beam is configured to apply focusing/SPL-profile correction to the primary audio modulated beam, and accordingly its is typically configured to produce an audible sound which is out of phase with respect to the audible sound produced by the primary audio modulated beam (e.g. with phase difference of $\pi$). The focal point of the secondary audio modulated beam is typically followed by the focal point of the primary audio modulated ultrasonic beam, such that a dip of the secondary audio modulated beam is located near/at the bright-zone region.

Requirement, transverse/lateral attenuation of the audible SPL, from bright to dark zone, is provided since the ultrasound directivity produced from an arrangement/array of transducer elements may be high. As will readily be appreciated by those versed in the art, the transverse/lateral attenuation is achieved according to some embodiments of the invention by careful design of the arrangement of transducer elements, and the frequencies and phases of the operative signals provided thereto may also be used to avoid grating lobes (e.g. by appropriate selection of a the carrier frequency/wavelength vs. transducers' membrane size, usage of sufficient number of transducers with appropriate arrangement/pitch between them—typically in pitch in the order of 1 wavelength or less).

In some cases, a lateral extent of the arrangement of acoustic transducers, which is used to produce the ultrasonic beams, is substantially smaller than a distance between the arrangement of acoustic transducers and the bright zone (e.g. a designated location at which the localized sound field should be produced). Accordingly, utilizing such an arrangement of acoustic transducers for focusing ultrasonic beams to distances comparable to that of the bright zone or greater, typically results in a lateral SPL profile having a peak in which lateral edges are relatively steep at the vicinity of the bright zone. To this end, the ultrasonic beams have sufficient SPL along the main beam with low SPL outside the beam, thus providing the confined localized audible sound field with respect to the lateral direction (e.g. X and/or Y axes in FIG. 2). With respect to the longitudinal Z axis, confinement is provided, as noted above, by utilizing the super positions of two or more ultrasonic beams focused on different locations.

It is noted that in some cases, utilizing two or more audio modulated ultrasonic beams (e.g. primary and secondary) may cause unwanted interactions between ultrasonic frequency components of these audio modulated ultrasonic beams which may in turn result in undesired audible sound artifacts. To this end, in embodiments utilizing two or more audio modulated ultrasonic beams, the selection of the frequency components of those beams (carrier and modulation frequencies) in operation 330 is adapted to avoid and/or reduce the undesired audible artifacts which may result from interaction between such frequency components.

Figure 5D:
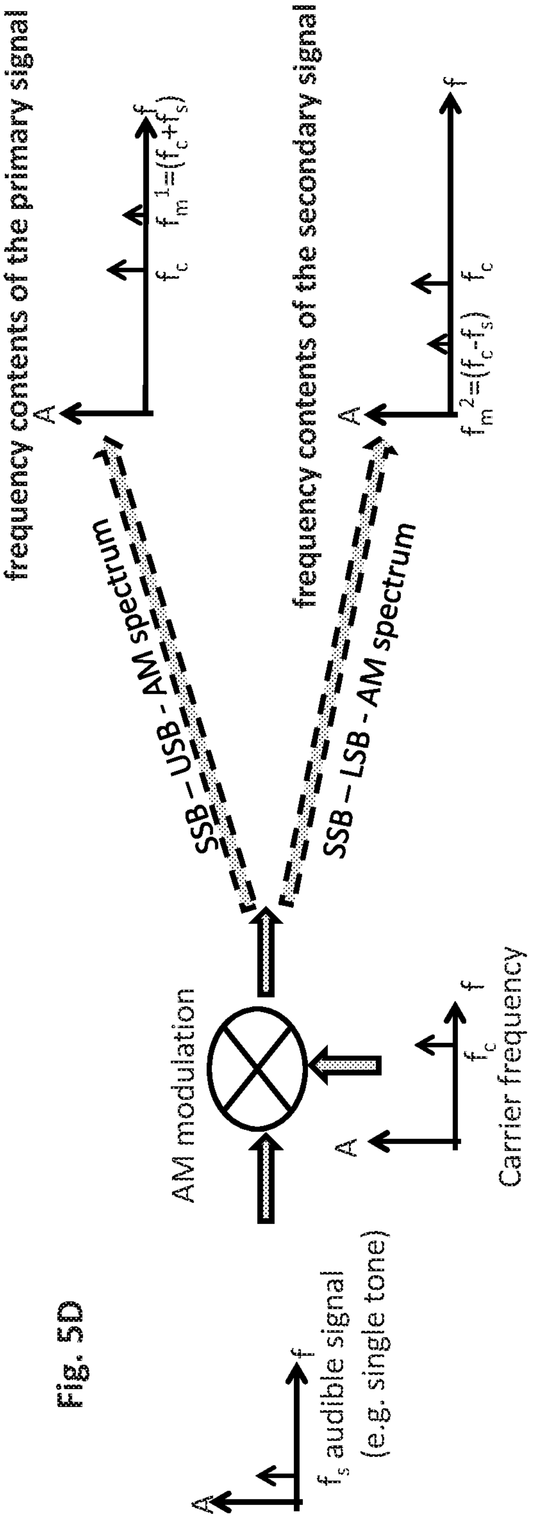
FIGS. 5D and 5E illustrate schematically two examples of modulation methods which may be used for producing audio modulated beams for generating a localized audible sound field.

For example, reference is made to FIG. 5D schematically illustrating an amplitude modulation (AM) scheme, which may be carried out for producing primary and secondary audio modulated beams while reducing the SPL of an unwanted sound artifact which may result due to non-linear interactions between them. The determination of the frequencies (carrier and modulation frequency components) which is performed in operation 330 may be carried out based on the principles illustrated in this figure. Specifically, here sound data is provided being indicative of audible sound to be produced with frequency $f_s$. For clarity of explanation, in the present example the audible frequency $f_s$ is represented as a discrete single tone sound. It should however be understood that the sound data may typically include a superposition of plurality of frequencies/single-tones. In this embodiment of the present invention, the primary and secondary audio modulated beams are produced by utilizing a single-side-band (SSB) AM modulation scheme. Specifically, here one of the primary and secondary audio modulated beams (in this example the primary) utilizes the upper-side-band (USB)-SSB-AM modulation and the other one (in this example the secondary) utilizes the lower-side-band (LSB)-SSB-AM modulation. Particularly, a common carrier frequency $f_c$ is used (e.g. it may optionally be determined in 330 and/or it may be predetermined in advance). However utilizing the USB AM modulation, the modulation frequency $f_m^1$ of the primary audio modulated beam in this case equals the sum of the carrier and audible sound frequency $f_m^2=(f_c-f_s)$ while the modulation frequency $f_m^2$ of the secondary audio modulated beam equals the difference between the carrier and audible sound frequency $f_m^2=(f_c-f_s)$ (or vice-versa in other embodiments). In this connection, as typically the amplitude of the carrier frequency component(s) is substantially greater than those of the modulation frequencies $f_m^1$ and $f_m^2$, by utilizing a common carrier frequency $f_c$ for both the primary and secondary audio modulated beams, an interaction between the carrier frequency components of the primary and secondary beams is avoided and undesired audible artifacts which may result from such interactions are obviated/diminished. Indeed, the non-linear interaction between each of the modulation frequencies $f_m^1$ and $f_m^2$ and the carrier frequency $f_c$ are desired as they produce a sound field with the desired audible frequency(ies) $f_s$. As for the interaction between the modulation frequencies $f_m^1$ and $f_m^2$ themselves, it is noted that the amplitudes of these frequency components are typically relatively small (e.g. relative to that of the carrier frequency) and therefore these interactions result in small artifacts which may have sufficiently low SPL and are not audible/comprehendible.

Figure 5E:
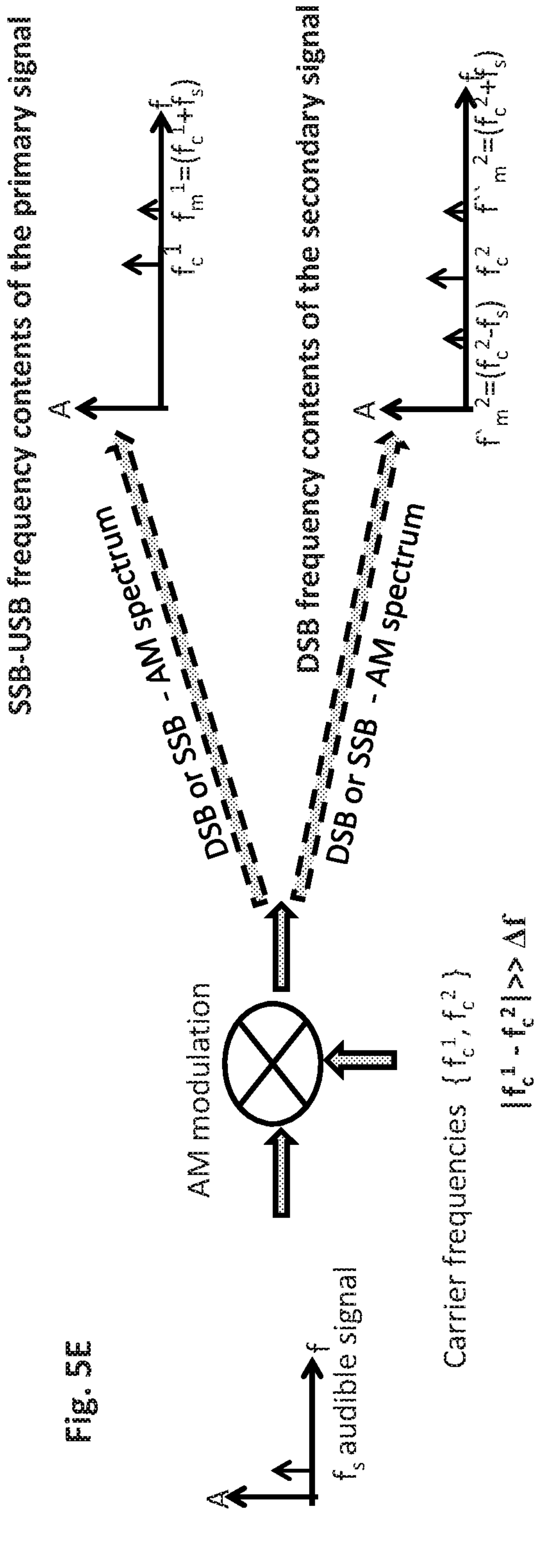

Alternatively or additionally, FIG. 5E illustrates schematically another example of a modulation technique which may be used for producing primary and secondary audio modulated beams while reducing the SPL of an unwanted sound artifact which may result from non-linear interactions between them. Here two different carrier frequencies, $f_c^1$ and $f_c^2$ for use for the primary and secondary audio modulated beams may be determined and/or a priori provided at operation 330. A difference between those carrier frequencies is sufficient such that a non linear interaction between them provides sound in the ultrasonic regime and not in the audible regime; namely $|f_c^1-f_c^2|>>\Delta f$ where $\Delta f$ is at the upper bound of the audible frequency range or above (e.g. $\Delta f>\sim 20$ KHz). Here each one of the primary and secondary audio modulated beams is associated with a respective one of the carrier frequencies $f_c^1$ and $f_c^2$ (in the present example $f_c^1$ is associated with the primary and $f_c^2$ is associated with the secondary).

Any suitable AM modulation technique may be used in order to produce/determine the desired frequency content for the primary and secondary audio modulated beams with audible frequency(ies) $f_s$. For example, a double side band (DSB) AM modulation can be used as well as SSB-AM modulation (being USB, LSB or both). In the present example, SSB-USB AM modulation is used for the primary audio-modulated beam with modulation frequency $f_m^1=(f_c^1+f_s)$ and DSB AM modulation is used for the secondary audio-modulated beam with modulation frequencies $f'_m{}^2=(f_c^2-f_s)$ and $f''_m{}^2=(f_c^2+f_s)$. In this connection it should be noted that utilizing the DSB AM modulation requires double the spectrum bandwidth than SSB, which may cause a considerable amount of total harmonic distortion (THD). Therefore, in some cases, use of SSB AM modulation may preferably be used, or the amplitude coefficients of the modulation frequency components are kept sufficiently small to reduce the THD, but sufficiently large to maintain good efficiency of audible sound from ultrasound generation by the non-linear medium.

Artifacts, which may result from interaction between the modulation frequencies of one audio-modulated beam and the carrier of the other audio-modulated beam, have frequencies above the audible frequency threshold due to the large gap between those frequencies resulting from the separation $\Delta f$ between the carrier frequencies $f_c^1$ and $f_c^2$. Also for the reasons mentioned above, artifacts, which may result from non-linear interaction between modulation frequencies (e.g. $f'^2$ and $f''_m{}^2$ in this case) of a DSB AM modulated beam (e.g. of the primary and/or secondary audio modulated beams) are sufficiently low, due to the amplitudes of the respective frequency components.

Figure 6A:
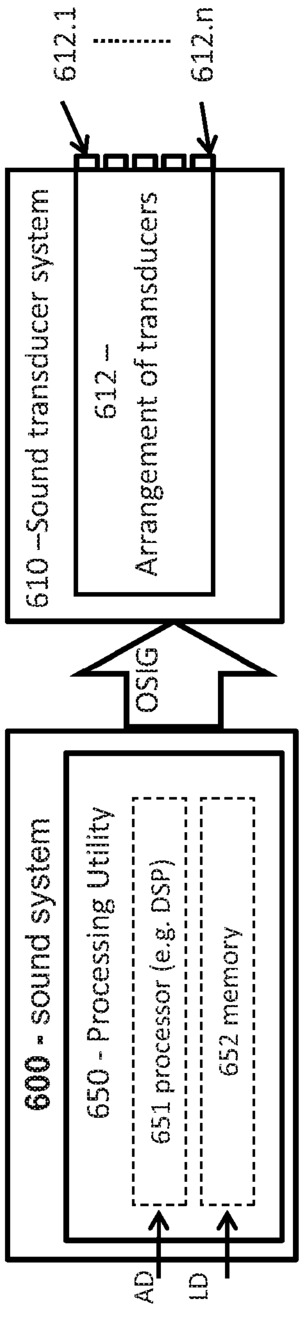
FIGS. 6A and 6B are block diagrams schematically illustrating two configurations of a sound system for generating localized audible sound field(s) according to some embodiments of the invention.

Reference is now made to FIG. 6A illustrating schematically in a block diagram a sound system 600 configured according to some embodiments of the present invention. The sound system 600 includes a processing utility 650 which is connectable to acoustic transducing system 610 including an arrangement of multiple acoustic transducers 612 (possibly including signal amplification module(s) as well. Acoustic transducer elements 612.1 to **612.*n* in the arrangement 612 are generally capable of producing sound in the ultrasonic frequency band. The processing utility 650 is configured and operable for obtaining sound-data (e.g. digital or analogue representation thereof) indicative of an audible sound to be produced and location-data (e.g. digital or analogue representation thereof) indicative of a spatial location at which to produce a localized sound field with that audible sound. Accordingly, utilizing the sound-data and the location-data, processing utility 650 is configured and operable to carry out the operations of method 300 described above for generating operative signals to be respectively provided to the acoustic transducer system 610 with the multiple acoustic transducers for generating the localized sound field. According to the present invention the processing utility 650** may be implemented by utilizing any suitable digital signal processing technique, analogue signal processing technique and/or combination of these techniques.

According to some embodiments of the present invention, the plurality of acoustic transducers is a two dimensional array of acoustic transducers 612.1 to 612.*n* which may be arranged in a two dimensional array or a one dimensional array to enable forming sound/ultrasound beams confined with respect to one or both of the lateral dimensions (X and Y in FIG. 2). For example, a substantially flat two dimensional array of acoustic transducers 612.1 to 612.*n* may be used for generating the localized sound field. According to some embodiments, the characteristic sizes of the acoustic transducer elements 612.1 to 612.*n* is in the order of the ultrasonic wavelengths which should be transmitted thereby (e.g. the wavelengths of the frequency components of the primary audio modulated ultrasonic beam and/or of other/additional ultrasonic beams). This enables the production of substantially confined ultrasonic beams with respect to the lateral directions and also enables adequate focusing of such beams. In many cases a lateral extent of the array of acoustic transducer elements 612.1 to 612.*n* is smaller than a distance between the array and a designated position with respect to the array at which a localized sound field should be produced by system 600. For example, lateral dimensions of the arrangement of acoustic transducers 612 may be in the order of a few centimeters to few decimeters to enable furnishing of such an arrangement 612 on portable communication devices such as mobile phones. The invention enables utilization of such a small sized arrangement for producing the localized sound field, with a designated location within a distance range of a few decimeters to a few meters from the arrangement 612.

Figure 6B:
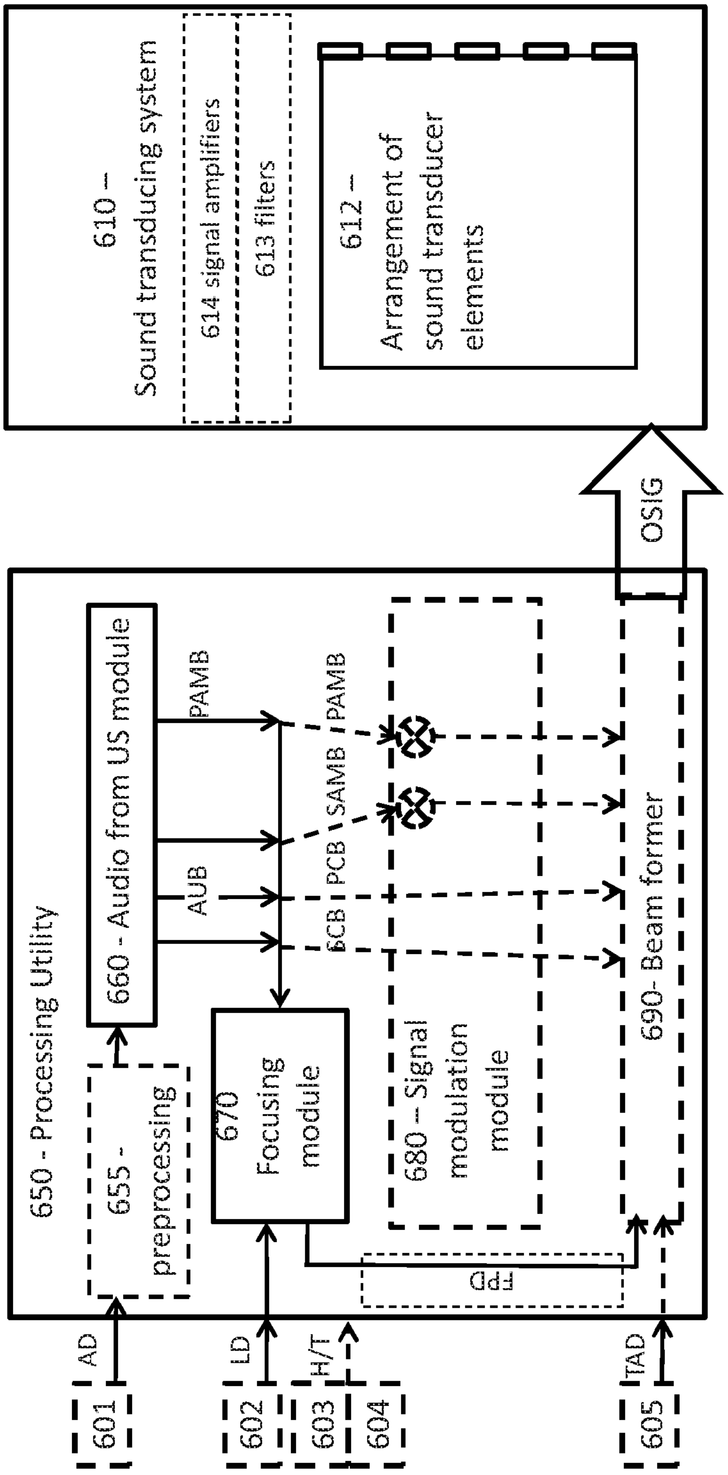

Reference is made to FIG. 6B illustrating in more detail the processing utility 650 of the sound system 600 as implemented in accordance with some particular embodiments of the present invention. In this example the processing utility 650 is shown to include several modules (i.e. 655, 660, 670, 680 and 690) which are configured and operable for performing some or all of the operations 310 to 380 of method 300 described above. In this regard it should be noted that each of these modules may be implemented analogically, digitally or by utilizing a combination of analogue and digital components. Accordingly, the terms signals and/or data indicated above with reference to various inputs and/or intermediate/final products of method 300 should be construed as referring to analogue and/or digital signals/data and/or to other representations of such signals/data in analogue or digital forms. Also according to some embodiments, one or more of modules of processing utility 650 may be implemented (e.g. at least in part) by software code which may be embedded on volatile/non-volatile memory hardware (e.g. 652) and which may be executable by a computation module (e.g. 651) which may be multi-purpose processor(s) and/or by a designated computation module (e.g. digital signal processor (DSP)). The modules (i.e. 655, 660, 670, 680 and 690) may also include in various embodiments of the present invention analogue circuits/components associated with analogue components such as signal amplifiers, attenuators, modulators, mixers, filters, delay lines and/or other digital/analogue components such as A/D and D/A converters. It should be noted that any of the modules 655, 660, 670, 680 and 690 depicted in FIG. 6B, may in practice be combined or divided in other modules or utilities of the processing utility 650. These modules represent functional operations which may in some cases be carried out/distributed by one or more other modules.

Thus in the present example processing utility 650 includes an audio from ultrasonic module and a focusing module. The audio from ultrasonic module 660 is capable of receiving (e.g. from a microphone 601 or other utility such as memory associated therewith) audio/sound-data AD indicative of audible sound to be produced and utilizing the sound-data AD to determine frequency content of at least two sound signals/beams/waveforms to be transmitted by acoustic transducer system 610 for producing the audible sound. In fact the audio from ultrasonic module 660 is configured and operable for performing operation 330 (e.g. 330.1 and/or 330.2) of method 300 to determine the frequency content of at least two ultrasonic beams including at least one primary audio modulated ultrasonic beam PAMB and one or more additional ultrasonic beams AUB. The frequency contents of the primary audio modulated ultrasonic beam PAMB includes at least two ultrasonic frequency components selected to enable sound from ultrasonic production of the audible sound while undergoing non-linear interaction in a non linear medium. The frequency contents of the one or more additional ultrasonic beams AUB include two or more frequency components to be superimposed with the primary audio modulated ultrasonic beam PAMB for producing the localized sound field at the designated spatial location.

It should be noted that according to some embodiments of the present invention the processing utility 650 optionally includes also a preprocessing module 655 which is capable of processing the original audible sound-data AD for generating a modified audible sound data/signal in accordance with the operation 315 of method 300 described above. The modified audible sound-data AD may be then further used by the various modules of the system to produce a localized sound field which corresponds to the original sound data more faithfully and/or with reduced distortions. A correspondence between the audio content in the original and modified sound data is provided for example above with reference to Eq. 3.

The focusing module 670 is capable of receiving (e.g. from a location sensor/data source 602 associated therewith) location data LD indicative of a designated spatial location at which to produce the localized audible sound field and utilizing the location data for determining at least two focal points (i.e. focal points data FPD) for the at least two ultrasonic beams whose frequency content is determined by the audio from ultrasonic module respectively. In fact, the focusing module 670 is configured and operable for performing operation 340 (e.g. 340.1 and/or 340.2) of method 300 to determine that focal points data FPD for focusing the beams PAMB and AUB to respective focal points to enable generation of the localized sound field with the audible sound in the vicinity of the designated spatial location. In some embodiments of the invention the focusing module 670 is also configured and operable for carrying out operation 350 of method 300. Specifically in such embodiments the focusing module 670 is also configured and operable for determining relative phases and possibly also amplitudes of the primary audio modulated ultrasonic beam PAMB and the one or more additional ultrasonic beams AUB such that when said primary audio modulated ultrasonic beam and said one or more additional ultrasonic beams are focused on their respective focal points FPD with those relative phases, the desired localized audible sound field is produced at the designated spatial location. In this connection it should be noted that the location data LD and audio data AD may be stored at a memory module of the sound system 600 (e.g. at memory 652 illustrated in FIG. 6A) or one or both of these data may be provided to the system (e.g. in real time) via an input module such as an input port and/or communication module which are not specifically shown in FIGS. 6A and 6B.

According to some embodiments of the present invention the frequency content of the primary audio modulated ultrasonic beam PAMB may be adapted to determine by the audio from ultrasonic module 660 to include a carrier ultrasonic frequency component and a modulation ultrasonic frequency component with a difference between them that corresponds to a frequency of the audible sound. Also the frequency content of the one or more additional ultrasonic beams AUB may be determined by the audio from ultrasonic module 660 to include one or more ultrasonic frequency components which are selected to enable confinement of the localized sound field by interacting with the primary audio modulated ultrasonic beam PAMB. Also according to some embodiments of the present invention, determination of the at least two distinct focal points may be included in the focal point data FPD determined by the focusing module 670. The distinct focal points may include a certain focal point for focusing the primary audio modulated ultrasonic beam PAMB and one or more focal points for focusing the one or more additional ultrasonic beams AUB, one or more of them being distinct from that certain focal point.

Specifically the audio from ultrasonic module 660 may be adapted to determine one or more additional ultrasonic beams AUB including at least one of the following:

- one or more primary corrective ultrasonic beams PCB each associated with correction of an SPL profile of a ultrasonic frequency component of the primary audio modulated ultrasonic beam PAMB. This component, whose profile is to be corrected, may be a carrier and/or a modulation frequency component of the primary audio modulated ultrasonic beam PAMB.
- a secondary audio modulated ultrasonic beam SAMB including at least two ultrasound frequency components which enable audible sound from ultrasound production of the audible sound indicated in the audio data AD. The secondary audio modulated ultrasonic beam SAMB thereby enables correction of an audible SPL profile of the primary audio modulated ultrasonic beam PAMB;
- one or more secondary corrective ultrasonic beams SCB each associated with correction of an SPL profile of a ultrasonic frequency component of the secondary audio modulated ultrasonic beam SAMB.

A more detailed description of the operation of the audio from ultrasonic module 660 is provided above with reference to the operation 330 of method 300 as it is described for example with reference to FIGS. 3 to 5E.

Accordingly, the focusing module 670 may be adapted to carry out at least one of the following for determining the focal points, relative phases and possibly amplitudes of the one or more additional ultrasonic beams AUB:

- determine respective focal points for the one or more primary corrective ultrasonic beams PCB and relative phases between the one or more primary corrective ultrasonic beams PCB and respective frequency component of the primary audio modulated ultrasonic beam PAMB. The focal points and relative phases may be determined in this case in order to produce predetermined interference between the primary audio modulated ultrasonic beam PAMB and the primary corrective ultrasonic beams PCB (e.g. to produce destructive interference at certain regions outside the designated spatial location and/or constructive interference in the vicinity of the designated spatial location);
- determine a focal point for the secondary audio modulated ultrasonic beam SAMB and a relative phase between the primary and secondary audio modulated ultrasonic beams, PAMB and SAMB. The focal points and relative phases may be determined in this case in order to cause distractive interference between audible sound waveforms/beams produced by the primary and audio modulated ultrasonic beams at dark zone regions in which the localized sound field should diminish.
- determine respective focal points for the one or more secondary corrective ultrasonic beams SCB and relative phases between the secondary corrective ultrasonic beams SCB and respective frequency component(s) of the secondary audio modulated ultrasonic beam SAMB. The focal points and relative phases may be determined in this case in order to produce interference between respective beams generated from the secondary audio modulated ultrasonic beam SAMB and the secondary corrective ultrasonic beams SCB to shape the audible SPL profile of the secondary audio modulated ultrasonic beam. Shaping of the audible SPL of the secondary audio modulated ultrasonic beam SAMB is aimed at improving the accuracy in utilizing that beam SAMB for suppressing certain portions of an audible SPL profile obtained from the primary audio modulated ultrasonic beam PAMB.

A more detailed description of the operation of the focusing module 670 is provided above with reference to the operations 340 and 350 of method 300 as these are described for example with reference to FIGS. 3 to 5E.

According to some embodiments of the present invention, the processing utility may include modulation module 680 that is capable of generating AM modulated signals. The modulation module 680 operates according to some embodiments of the present invention for receiving data PAMB indicative of the frequency components of the primary audio modulated beam and generating an AM signal modulated in accordance therewith. In cases where also a secondary audio modulated beam is used, the modulation module 680 may also operate for receiving data SAMB indicative of its frequency components and generate an AM signal modulated in accordance therewith. Then, such generated AM signals may be provided to a beam former module (e.g. 690) at which operative signals are determined enabling the generation of focused ultrasonic beams corresponding to those AM signals. It should be however noted that in some embodiments the modulation module 680 may be obviated and data/signals (e.g. PAMB and/or SAMB) indicative of frequency components of the primary/secondary audio modulated beams may be provided to a beam former module without being modulated by such a modulation module 680.

It should be understood that the AM technique is also used to generate/determine the modulations frequencies out of the audio data AD. That is, the audio from ultrasonic module 660 may operate to set an appropriate carrier frequency and perform AM on the audio data AD to obtain the relevant modulated frequencies in the frequency domain To this end, the modulation module 680 may also be located before the audio from ultrasonic module 660 or as a part of this module 660 where the modulation frequencies for the primary and additional beams are calculated.

In this connection, it should be noted that according to some embodiments the primary and secondary audio modulated ultrasonic beams (PAMB and SAMB) may be SSB-AM modulated beams which are associated with a similar carrier frequency. One of these audio modulated ultrasonic beams is an USB-SSB-AM modulation of the carrier frequency, and the other one is an LSB-SSB-AM modulation of that carrier frequency. Inter-modulation in-between the different spectrum components (e.g. of the USB and LSB modulated beams) may be avoided or reduced by careful adjusting of the ratio between the amplitude of the carrier frequency ($F_c$) and the side spectrum signals (i.e. modulation frequency components—$F_m$). According to some embodiments this ratio is in the order of 15:1 to 20:1 which was found to provide sufficient audio SPL yet avoid/reduce the inter-modulation to below audible/comprehendible levels.

It should be noted that utilizing two audio modulated beams (i.e. two primary audio modulated beams) one modulated beam utilizing USB-AM and the other modulated beam utilizing LSB-AM may also be used according to the present invention for respective generation of two localized sound fields at different designated locations which may have different audio content. Such two audio modulated beams may be formed separately to focus on those two different designated locations regions and may be transmitted by the same acoustic transducer system 610 (e.g. different parts of the same arrangement/array of transducer elements) and/or by utilizing more than one acoustic transducer system 610. Localization of audible sounds produced by these beams at such designated locations may be achieved for example by transmitting in additional ultrasonic beams associated with respective primary corrective beams, as noted above.

According to some embodiments of the present invention, the system 600 (e.g. processing utility 650) includes, or is associated with, a beam forming module 690 which is configured and operable for determining a plurality of operative signals OSIG to be respectively provided to the plurality of acoustic transducer elements 612.1 to 612.*n* of the acoustic transducer system 610 for forming a primary audio modulated ultrasonic beam corresponding to the primary audio modulated ultrasonic beam PAMB focused at a focal point associated therewith, and forming one or more additional ultrasonic beams AUB focused at respective focal points associated therewith. Specifically, the beam forming module 690 may be adapted to generate these operative signals OSIG such that these primary and additional beams are produced with the relative phases and with proper amplitudes between their frequency components (e.g. as determined by the focusing module 670) to enable production of the localized audible sound field. In this connection, beam forming module 690 may be configured to operate in accordance with any suitable beam forming technique for carrying out operations 370 and possibly also 390 of method 300 as described more specifically above. The principles of many such beam forming techniques are known in the art and need not be described here in details would readily be appreciated by persons versed in the art.

To this end, beam forming module 690 may utilize data TAD indicative of the arrangement of the multiple acoustic transducer elements 612.1 to 612.*n*, the frequency content PAMB and AUB of the beams determined by the audio from ultrasonic module 660, and the focal points and relative phases FPD determined by focusing module 670 in order to determine the operative signals OSIG for generation of the above mentioned beams focused at respective ones of these focal points by the arrangement of transducer elements 612. In this connection the data TAD may be hardcoded or may be provided from a data source (e.g. memory module) 605 associated/included with the system 600. The operative signals OSIG typically include a plural of signals each associated with one of the transducer elements 612.1 to 612.*n*. Also the operative signals OSIG are in many cases frequency-multiplex ultrasonic signals, at least some of which include frequency components which are associated with two or more of the ultrasonic beams PAMB and AUB. Namely the frequency-multiplex ultrasonic signals provided to the acoustic transducer system to generate ultrasound beams corresponding to both the primary audio modulated beam PAMB and the additional ultrasonic beams AUB at once thus yielding, after air demodulation, at least two independent acoustic field patterns which combine at the designated location to strong energy concentration and audible SPL thereat (e.g. audio-band SPL of about 70-80 dB). The amplitudes and phases of such operative signals OSIG beams are selected to generate these beams with focus on their respective focal points, with proper amplitudes and with the respective phase differences between them.

The ultrasound beams have sufficiently narrow width and their amplitudes are sufficiently high to produce sufficient ultrasound SPL at the designated location at which audible sound is to be produced by the non-linear behavior of the medium. Typically beamforming processing/calculation takes into account the desired focal points for the beams, the natural wave dispersion of the ultrasound wave (due to the mechano-acoustic structure of the transducer elements and their arrangement), the absorption of the ultrasound in the medium/air possibly also in accordance with the humidity and temperature of the medium. In this connection, the system 600, according to some embodiments thereof, may include or be associated with humidity sensor(s) 603 and/or with temperature sensor(s) 604 providing thereto data H/T indicative of the humidity and/or temperature of the surroundings. This data H/T may be processed by one or more of the modules 655, 660 and 670 to more accurately determine the operative signals OSIG needed for producing a desired localized sound field.

As noted above, the multiple transducer elements 612.1 to 612.*n* may be arranged to form a flat array. The elements 612.1 to 612.*n* may be driven separately by respective operative/multiplexed signals OSIG (i.e. in accordance with the frequency contents, amplitudes and phases indicated in each of these signals) to compose sound waves in the ultrasound regime forming ultrasound beams from which audible sound is generated. The beams may be steered and focused to various points in the positive hemisphere with respect to the array (e.g. points for which Z>0). Focusing may be achieved utilizing the known principles of wave theory for distances below the Rayleigh distance and in accordance with the frequency content of the ultrasound waves (e.g. (carrier/modulation frequencies) and the effective transducer aperture area (e.g. the effective size of the transducer as if it was one solid membrane).

It should be understood that according to some embodiments of the invention the beam shaping module may be capable of determining the plurality of operative signals OSIG such that at least two ultrasound beams (e.g. beams associated with the primary audio modulated ultrasonic beam PAMB and the additional ultrasonic beam AUB), are generated utilizing the same or different subsets of the acoustic transducer elements 612.1 to 612.*n*. Also according to some embodiments, the system 600 and the processing utility 650 may be capable of generating a plurality (e.g. two or more) localized sound fields at two distinct designated locations for producing thereat the same or different content of audible sound. Also in such embodiments, different subsets of the acoustic transducer elements 612.1 to 612.*n* might be used to produce the two or more localized sound fields.

Figure 7:
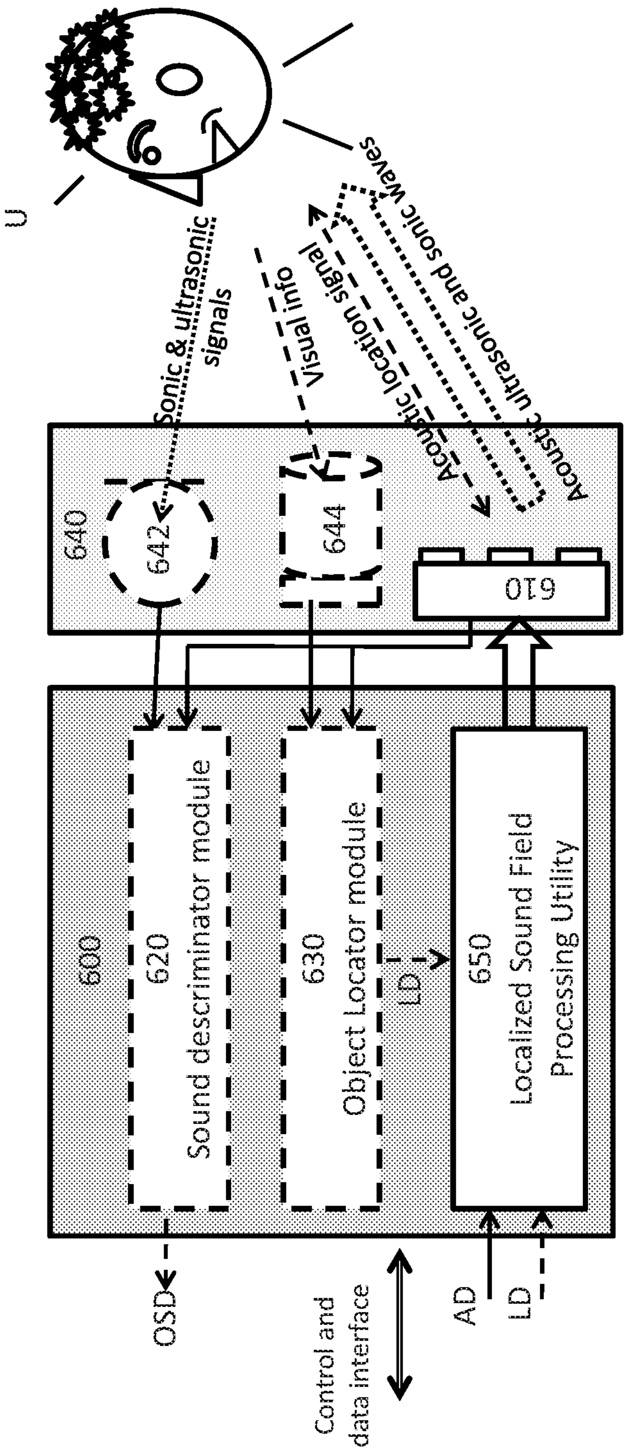
FIG. 7 is a block diagram of a sound system configured according to some embodiments of the invention and including at least one of the following: a sound discriminator module capable of discriminating a user's voice and an object locator module capable of determining a user's location.

Reference is now made to FIG. 7 illustrating schematically a sound system 600 configured according to another embodiment of the present invention. Here the sound system includes a processing utility 650 which is capable of producing a localized sound field in the vicinity of a designated location (e.g. target user). The processing utility 650 may be connectable to a acoustic transducer system 610 including a plurality of transducer elements and may be configured for carrying out method 300 above for generating a localized sound field utilizing the acoustic transducer system 610. For example the processing utility 650 may be configured as described with reference to FIGS. 6A and 6B above.

In the present embodiment of FIG. 7 the sound system 600 may include one or both of the following modules:

- sound discriminator module 620 capable of receiving input sound from a microphone 642 and process that sound to determine and possibly discriminate/isolate only sound arriving from the designated location at which the user is located, and in some case determine/isolate the user's voice;
- object locator module 630 capable of receiving data from one or more peripherals 640 such as the acoustic transducer system 610, an imager (e.g. a wide angle camera) and/or a microphone 642 (e.g. broad band microphone sensitive to audible and ultrasonic waves) and process that sound to determine the location of the user at which localized sound field should be generated (e.g. determine the location data LD).

It should be noted that modules 620 and 630 may include, or be associated with, a processing module/unit (e.g. CPU/DSP) and memory which are usable for carrying out processing operations which are required for performing the sound discrimination and/or object locating as those which are described more specifically below. The processing and memory modules may be common to one or more modules of the system 600. For example the same processor and memory may serve modules 620, 630 and 650.

In embodiments including an object locator module 630, the object locator module 630 tracks the targeted user (e.g. constantly) and determines location information (e.g. data/signals LD) indicative of the location of the user U, his head and/or ears. The location data LD may then be provided to the processing utility 650 as an input to cause the processing utility 650 to generate the localized sound field with the desired audio at the location of the user, while the user may move. Tracking the user's location may be achieved by various technologies. For example, an imager 644, such as a video camera equipped with wide field of view lens, may be set/directed to monitor/image the region at which it is possible to create localized sound field by the system (e.g. monitoring the positive half hemisphere with respect to the sound traducer system 610). Object locator module 630 may include an image processing module which is capable receiving and processing data indicative of images from the camera 644 and recognizing therein the presence of a person and/or of certain individual(s) and the respective location of his/their head. The latter may be determined as the location data LD. As will be readily appreciated by those versed in the art, there are currently many image-processing/pattern recognition techniques capable of recognizing persons or certain individuals in an image or video footage. Object locator module 630 may utilize any such techniques as suitable with particular implementations of the system of the present invention. For example, 630 may include personalization capability enabling it to locate a specific user in a picture with many users (e.g. based on face recognition).

Alternatively or additionally, object locator module 630 may be configured and operable for carrying out other object tracking techniques for example acoustic techniques or other. To this end, the object locator module 630 may utilize other peripheral modules such as the transducer system 610 and/or microphone 642 and/or other peripherals not specifically illustrated in the figure.

Specifically, according to some embodiments of the present invention, the acoustic transducer system 610 may be configured and operable for producing steerable ultrasound waves/beams. The object locator module 630 is capable of utilizing the acoustic transducer system 610 for implementing a compact sonar system capable of monitoring people/objects nearby. To this end, the object locator module 630 may be connectable, directly or indirectly, to the acoustic transducer system 610 and to an ultrasound sensitive microphone 642 (which may be wideband microphone sensitive to ultrasonic and audible sounds). The object locator module 630 is capable of determining the properties/directions of ultrasonic beam(s) to be transmitted by the acoustic transducer system 610 and operate the acoustic transducer system 610 to transmit ultrasonic beam(s) accordingly. The object locator module 630 is also capable of receiving ultrasonic data indicative of ultrasounds intercepted/detected by the microphone 642 and process this ultrasonic data to determine/calculate time-of-flight of the transmitted ultrasonic beams (e.g. of their echoes/reflections) and/or determine other parameters of the ultrasonic data indicative of the distances/locations of objects which are located in the beam's path. As will be appreciated by persons versed in the art, there are various known sonar techniques which can be implemented by the object locator 630 of the present invention to locate objects/persons in front of the acoustic transducer system 610 (e.g. in the positive hemisphere with respect thereto). For example, the direction towards a detected object may be associated with the direction of a respective transmitted ultrasonic beam whose reflection is detected (e.g. by microphone 642), the distance towards the detected object may be determined based on the time of flight of the beam (e.g. measured from the transmission time to the time of detection of a corresponding/reflected beam). According to some embodiments the object locator module 630 is associated with an imager 644 and is capable of operating the ultrasonic beam of the sonar in correlation with information/image data from the imager 644 (e.g. to direct ultrasonic beams only towards directions at which objects/persons are at least crudely identified in the image data). Such a combination of visual data from the imager and sonar operation of the acoustic transducer system 610 may be used to provide better accuracy in detection of the location of a target user.

It is noted that in some cases the acoustic transducer system 610 may perform as the microphone 642. Therefore, in this case use of a separate microphone may be obviated. Specifically, acoustic transducer system 610 may be configured utilizing Piezo-electric transducer elements which may operate together as a microphone array (e.g. ultrasonic and/or wide band microphones) at times when they are not utilized for the generation of localized sound fields. The use of the acoustic transducer system 610 as an array of ultrasonic microphones may provide data indicative of the directions of detected sound beams, thus improving the accuracy to the object detection utilizing sonar techniques.

It is noted that the invention may be implemented in portable/compact electronic communication devices such as mobile phones. In such cases the object locator module 630 may utilize peripherals such as a camera 644 and a microphone 642, modules which typically exist in such communication devices. Object locator module 630 operable with sonar capabilities may also serve as, or instead of, a proximity sensor which is commonly available in such communication devices. In addition, utilizing the sonar technique for object detection provides improved operation under low light conditions.

In embodiments including the sound discriminator module 620, the sound discriminator module 620 is configured and operable to filter sound signals inputted thereto (e.g. from microphone 642) to discriminate therefrom sound portions/data which is associated with the user (e.g. the user's voice). According to some embodiments of the present invention, this is achieved by utilizing the Doppler method for discriminating user voice (e.g. described in "*Ultrasonic Doppler Sensor for Voice Activity Detection*" by Kaustubh Kalgaonkar, Rongquiang Hu and Bhiksha Raj; published by "Mitsubishi Electric Research Laboratories"; TR2007-106 August 2008; see http://www.merl.com).

In such embodiments, the sound discriminator module 620 is connectable to the processing utility 650 or directly to the acoustic transducer system 610 and is operable for utilizing the acoustic transducer system 610 for sending an ultrasound beam/waveform (e.g. at discrete frequency) towards the location of the user. When such waveform hits the user's face/head, it is reflected back but it is however Doppler modulated by movements of the face/head. Specifically, when the user is talking and/or moving his mouth, the reflected ultrasound will be Doppler modulated by movement of mouth and throat. To this end, the sound discriminator module 620 may be connectable to an ultrasonic sensitive microphone (e.g. 642 or other) which is capable of detecting the Doppler modulated reflection of the transmitted ultrasound beams. The sound discriminator module 620 may also be connectable to a microphone in the audible range microphone (e.g. 642 or other) operable for detecting audible sounds (e.g. including that of the user). Sound discriminator module 620 may be adapted to process the audible sound detected together with the Doppler modulated reflection for filtering the audible sounds based on a correlation of the audible sound with the Doppler reflected sounds. This technique enables to discriminate the user's voice which is relatively correlated with the Doppler ultrasound reflections since the ultrasound beam is directed/focused at the user. Other noises/artifacts which are not correlated with the Doppler ultrasound reflections may thus be filtered out to discriminate the user's voice (see for example "Multimodal speech recognition with ultrasonic sensors", by Bo Zhu, Timothy J. Hazen and James R. Glass, Proceedings of Interspeech, Antwerp, Belgium, August 2007).

It should be noted that the ultrasound beam which is used for creating the Doppler reflection may be one of the beams used for creating the localized sound field or portions thereof. For example, this may be the carrier frequency components of the primary audio modulated beam. Should the system be in listening mode, in which it is not used for producing a localized sound field, the carrier frequency may be transmitted without modulation (i.e. without being audio modulated).

The invention claimed is:

1. A method for generating a localized audible sound field at a designated spatial location, the method comprising:

providing sound-data indicative of an audible sound to be produced;

utilizing the sound-data and determining frequency content of at least two ultrasound beams to be transmitted by an acoustic transducer system including an arrangement of a plurality of ultrasound transducer elements for generating said audible sound;

wherein said at least two ultrasound beams include at least one primary audio modulated ultrasound beam, whose frequency contents includes at least two ultrasonic frequency components selected to produce said audible sound after undergoing non-linear interaction in a non-linear medium, and one or more additional ultrasound beams each including one or more ultrasonic frequency components;

providing location-data indicative of a designated spatial location at which that audible sound is to be produced;

utilizing said location data and determining at least two focal points for said at least two ultrasound beams respectively; wherein said at least two focal points include at least two distinct points comprising a focal point for focusing said primary audio modulated ultrasonic beam and one or more focal points for focusing said one or more additional ultrasound beams; and wherein focusing said at least two ultrasound beams on said at least two distinct focal points provides for generation of a confined localized sound field with said audible sound in the vicinity of said designated spatial location.

2. The method according to claim 1, further comprising determining relative phases of said primary audio modulated ultrasonic beam and said one or more additional ultrasound beams such that when said primary audio modulated ultrasonic beam and said one or more additional ultrasound beams are focused on their respective focal points with said relative phases, a localized audible sound field with said audible sound is produced at said spatial location.

3. The method according to claim 1 wherein the frequency content of said at least one primary audio modulated ultrasonic beam includes:

a carrier ultrasonic frequency component and a modulation ultrasonic frequency component with a difference between them which corresponds to a frequency of said audible sound thereby enabling audible sound from ultrasound production of said audible sound; and a frequency content of said one or more additional ultrasound beams comprises one or more ultrasonic frequency components selected to enable confinement of said localized sound field by interaction with said primary audio modulated ultrasonic beam.

4. The method according to claim 1, further comprising providing data indicative of an arrangement of multiple acoustic transducers with respect to said spatial location and determining a plurality of operative signals to be respectively provided to a plurality of said acoustic transducers for forming said primary audio modulated ultrasonic beam focused on a respective one of said focal points associated therewith and for forming one or more additional ultrasound beams focused on respective one or more of said focal points associated therewith with relative phases between the frequency components of said primary audio modulated ultrasonic beam and said one or more additional ultrasound beams selected for producing said localized audible sound field at said spatial location.

5. The method according to claim 1 wherein said one or more additional ultrasound beams include at least one primary corrective ultrasonic beam associated with a correction of an sound pressure level (SPL) profile associated with a respective ultrasonic frequency component of said primary audio modulated ultrasonic beam being one of a modulation ultrasonic frequency component and a carrier ultrasonic frequency component of said primary audio modulated ultrasonic beam; the frequency contents of said at least one primary corrective ultrasonic beam includes the frequency component associated with the frequency of said ultrasonic frequency components of said primary audio modulated ultrasonic beam and a relative phase between the frequency component of said primary corrective ultrasonic beam and said respective frequency component of said primary audio modulated ultrasonic beam is selected to affect a predetermined interference pattern between them.

6. The method according to claim 1, further comprising:

wherein said one or more additional ultrasound beams include at least one secondary audio modulated ultrasonic beam; and determining at least two ultrasound frequency components for the secondary audio modulated ultrasonic beam enabling audible sound from ultrasound production of said audible sound by the secondary audio modulated ultrasonic beam; and determining a focal point for focusing said secondary audio modulated ultrasonic beam and a relative phase between primary audio modulated ultrasonic beam and said secondary audio modulated ultrasonic beam such as to cause distractive interference between audible sound produced by said primary audio modulated ultrasonic beam and audible sound produced by said secondary audio modulated ultrasonic beam at dark zone regions in which said localized sound field should diminish.

7. The method according to claim 6 wherein said determining at least two ultrasound frequency components for the secondary audio modulated ultrasonic beam includes determining an additional modulation ultrasonic frequency and an additional carrier ultrasonic frequency for the additional secondary audio modulated ultrasonic beam wherein a difference between the additional modulation ultrasonic frequency and the additional carrier ultrasonic frequency corresponds to a frequency of said audible sound.

8. The method according to claim 6 wherein said primary audio modulated ultrasonic beam and said secondary modulated ultrasonic are single side band (SSB) AM modulated beams associated with a similar carrier frequency and wherein one of said AM modulated beams comprises an upper side band (USB) AM modulation of said similar carrier frequency and another one of said AM modulated beams comprises a lower side band (LSB) AM modulation of said similar carrier frequency.

9. The method according to claim 6, further comprising:

wherein said one or more additional ultrasound beams include at least one secondary corrective ultrasonic beam associated with said secondary audio modulated ultrasonic beam; and determining one or more parameters of said secondary corrective ultrasonic beam to enable utilization of said secondary corrective ultrasonic beam for adjusting the spatial shape of an audible sound pressure level (SPL) profile obtained utilizing said secondary audio modulated ultrasonic beam thereby improving the accuracy in utilizing said secondary audio modulated ultrasonic beam for suppressing certain portions of an audible SPL profile obtained from said primary audio modulated ultrasonic beam.

10. The method according to claim 1 wherein a focal point for focusing said primary audio modulated ultrasonic beam is substantially at said designated spatial location and focal points associated with one or more of said additional ultrasound beams follow said designated spatial location along a general direction from said arrangement of acoustic transducers to said spatial location.

11. The method according to claim 10 wherein a lateral extent of said arrangement of acoustic transducers is substantially smaller than a distance between said arrangement of acoustic transducers and said designated spatial location such that utilizing said arrangement of acoustic transducers for focusing a beam corresponding to said primary audio modulated ultrasonic beam at said focal point results in an effective sound pressure level (SPL) peak at a point following said focal point along said general direction and a residual SPL tail following said peak and wherein focusing one or more beams corresponding to said one or more additional ultrasound beams on their respective focal points results with at least one of the following: the location of said effective SPL peak being corrected towards said designated spatial location and the residual SPL tail being suppressed.

12. The method according to claim 1 wherein said confined localized sound field is associated with a bright zone in which a sound pressure level (SPL) of said audible sound exceeds a predetermined bright sound threshold; said bright zone surrounds said spatial location and extends not more than a certain predetermined distance following said spatial location with respect to a general longitudinal direction from said arrangement to said spatial location and extends not more than a certain predetermined distance from said spatial location with respect to at least one lateral axis perpendicular to said longitudinal direction.

13. The method according to claim 1 wherein said confined localized sound field is associated with a dark zone located outside a bright zone of said localized sound field and wherein an SPL of said audible sound in said dark zone is lower than a predetermined dark sound threshold.

14. A sound system, comprising:

a processing utility connectable to an arrangement of multiple acoustic transducers which are capable of producing sound in the ultrasonic frequency band, the processing utility is adapted for obtaining sound-data indicative of an audible sound and location-data indicative of a spatial location at which to produce a localized sound field and configured and operable to carry out the operations according to the method of claim 1 for utilizing said sound-data and said location-data and generating operative signals to be respectively provided to said multiple acoustic transducers for generating said localized sound field.

15. The method of claim 1 wherein said at least two distinct focal points are arranged along a common general direction of propagation Z of the at least two ultrasound beams towards said designated spatial location, and wherein the method comprises directing said at least two ultrasound beams for propagating along said common general direction of propagation and focusing said at least two ultrasound beams on said at least two distinct points respectively.

16. A system, comprising:

a processing utility connectable to an acoustic transducer system comprising an arrangement of multiple acoustic transducers which are capable of producing sound in the ultrasonic frequency band, the processing utility adapted for obtaining sound-data indicative of an audible sound and location-data indicative of a designated spatial location and determining sound signals to be provided to said arrangement of multiple acoustic transducers for producing a confined localized sound field with said audible sound at said spatial location, the processing utility including:

an audio from ultrasonic modulation module capable of utilizing said sound-data for determining frequency content of at least two ultrasound beams to be transmitted by said acoustic transducer system;

wherein said at least two ultrasound beams include at least one primary audio modulated ultrasound beam, whose frequency contents include at least two ultrasonic frequency components selected to enable sound from ultrasonic production of said audible sound while undergoing non-linear interaction in a non-linear medium; and one or more additional ultrasound beams comprising two or more frequency components to be superimposed on said primary audio modulated ultrasound beam for producing said localized sound field at said designated spatial location;

a focusing module capable of utilizing said location data and determining at least two distinct focal points for said at least two ultrasound beams respectively, wherein said at least two distinct focal points comprise a focal point for focusing said primary audio modulated ultrasonic beam and one or more focal points for focusing said one or more additional ultrasound beams, such that focusing said at least two ultrasound beams on said at least two distinct focal points provides for generation of a confined localized sound field with said audible sound in the vicinity of said designated spatial location.

17. The system according to claim 16 wherein said focusing module is capable of determining relative phases of said primary audio modulated ultrasonic beam and said one or more additional ultrasound beams such that when said primary audio modulated ultrasonic beam and said one or more additional ultrasound beams are focused on their respective focal points with said relative phases, a localized audible sound field with said audible sound is produced at said spatial location.

18. The system according to claim 16 wherein said audio from ultrasonic modulation module is adapted to determine the frequency content of said at least one primary audio modulated ultrasonic beam such that it includes a carrier ultrasonic frequency component and a modulation ultrasonic frequency component with a difference between them corresponding to a frequency of said audible sound thereby enabling audible sound from ultrasound production of said audible sound; and a frequency content of said one or more additional ultrasound beams includes one or more ultrasonic frequency components selected to enable confinement of said localized sound field by interacting with said primary audio modulated ultrasonic beam.

19. The system according to claim 16, further comprising a beam forming module configured and operable for utilizing data indicative of the arrangement of said multiple acoustic transducers, said frequency content of said at least two ultrasound beams and said at least two focal points to determine a plurality of operative signals to be respectively provided to a plurality of said acoustic transducer elements of said acoustic transducer system for forming said primary audio modulated ultrasonic beam focused on a focal point associated therewith and forming one or more additional ultrasound beams focused on respective focal points associated therewith with relative phases between the frequency components of said primary audio modulated ultrasonic beam and said one or more additional ultrasound beams selected to enable production of said localized audible sound field at said designated spatial location.

20. The system according to claim 16 wherein said audio from ultrasonic modulation module is adapted to determine said one or more additional ultrasound beams such that said one or more additional ultrasound beams comprise at least one of the following:

one or more primary corrective ultrasonic beams each associated with correction of an SPL profile of a ultrasonic frequency component of said primary audio modulated ultrasonic beam wherein said component being one of a carrier and modulation frequency component;

at least one secondary audio modulated ultrasonic beam comprising at least two ultrasound frequency components enabling audible sound from ultrasound production of said audible sound and thereby enabling correction of an audible SPL profile of said primary audio modulated ultrasonic beam; or one or more secondary corrective ultrasonic beams each associated with correction of an SPL profile of a ultrasonic frequency component of said secondary audio modulated ultrasonic beam.

21. The system according to claim 16 wherein said one or more additional ultrasound beams comprise at least one of the following:

i. one or more primary corrective ultrasonic beams each associated with correction of an SPL profile of a ultrasonic frequency component of said primary audio modulated ultrasonic beam wherein said component being one of a carrier and modulation frequency component; and wherein the focusing module is adapted to determine respective focal points for said one or more primary corrective ultrasonic beams and relative phases between said one or more primary corrective ultrasonic beams and respective frequency component of said primary audio modulated ultrasonic beam to produce destructive interference between respective ultrasound beams generated from said primary audio modulated ultrasonic beam and said primary corrective ultrasonic beams at certain regions outside said designated spatial location;

ii. at least one secondary audio modulated ultrasonic beam comprising at least two ultrasound frequency components enabling audible sound from ultrasound production of said audible sound and thereby enabling correction of an audible SPL profile of said primary audio modulated ultrasonic beam; and wherein the focusing module is adapted to determine a focal point for said secondary audio modulated ultrasonic beam and a relative phase between the primary and secondary audio modulated ultrasonic beams such as to cause distractive interference between audible sound produced by audible sound waveforms generated from said primary and secondary audio modulated ultrasonic beams at dark zone regions at which said localized sound field should diminish; or iii. one or more secondary corrective ultrasonic beams each associated with correction of an SPL profile of a ultrasonic frequency component of said secondary audio modulated ultrasonic beam; and wherein the focusing module is adapted to determine respective focal points for said one or more secondary corrective ultrasonic beams and relative phases between said one or more secondary corrective ultrasonic beams and respective frequency component of said secondary audio modulated ultrasonic beam to produce interference between respective ultrasound beams generated from said secondary audio modulated ultrasonic beam and said secondary corrective ultrasonic beams to improve the accuracy in utilizing said secondary audio modulated ultrasonic beam for suppressing certain portions of an audible SPL profile obtained from said primary audio modulated ultrasonic beam.

22. The system of claim 16 wherein said focusing module is adapted for determining said at least two distinct focal points such that the at least two distinct points are arranged along a common general direction of propagation Z of the at least two ultrasound beams towards said designated spatial location, and wherein the system is configured for directing at least two ultrasound beams for propagating along said common general direction of propagation and for focusing said at least two ultrasound beams on said at least two distinct points respectively.

23. A system, comprising:

a processing utility connectable to an acoustic transducer system comprising an arrangement of multiple acoustic transducers which are capable of producing sound in the ultrasonic frequency band;

wherein the processing utility is adapted for obtaining sound-data indicative of an audible sound and location-data indicative of a designated spatial location and determining frequency content, directionality and focusing properties of at least two ultrasound beams to be generated by said acoustic transducer system such that non-linear interaction of said super-position of the at least two ultrasound beams in a non-linear medium generates the confined localized sound field with said audible sound being hearable and confined to the vicinity of said designated spatial location; and wherein the directionality of the at least two ultrasound beams is such that the at least two ultrasound beams propagate along a common general direction of propagation and the focusing properties of said at least two ultrasound beams is such that the at least two ultrasound beams are respectively focused on at least two distinct points arranged along the common general direction of propagation Z of the at least two ultrasound beams.

* * * * *